(12) United States Patent
Nagai et al.

(10) Patent No.: US 6,217,375 B1
(45) Date of Patent: Apr. 17, 2001

(54) WIRING HARNESS ARRANGING CONSTRUCTION

(75) Inventors: Satoshi Nagai; Tetuya Funaki; Masahisa Suzuki; Yasuhiro Ando; Shinya Miyamoto, all of Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/294,102

(22) Filed: Apr. 19, 1999

Related U.S. Application Data

(63) Continuation of application No. 08/997,580, filed on Dec. 23, 1997, now Pat. No. 5,957,702.

(30) Foreign Application Priority Data

| Dec. 25, 1996 | (JP) | 8-345949 |
| Dec. 25, 1996 | (JP) | 8-345950 |
| Dec. 26, 1996 | (JP) | 8-347066 |
| Dec. 26, 1996 | (JP) | 8-347067 |
| Dec. 26, 1996 | (JP) | 8-348286 |

(51) Int. Cl.$^7$ .................................................. H01R 13/72
(52) U.S. Cl. .............................................. 439/501; 439/34
(58) Field of Search ............................. 439/501, 34, 35; 242/107, 54 R

(56) References Cited

U.S. PATENT DOCUMENTS

| 1,637,059 | 7/1927 | Simmons . |
| 2,184,363 | 12/1939 | Schultz et al. . |
| 3,909,047 | 9/1975 | Salmela . |
| 4,006,952 | 2/1977 | Puckett . |
| 4,337,596 | 7/1982 | Kern et al. . |
| 4,992,629 | 2/1991 | Morais . |
| 5,003,129 | * 3/1991 | Toyomasu et al. .................... 174/69 |
| 5,164,546 | 11/1992 | Kumagai . |
| 5,521,806 | 5/1996 | Hutzel et al. . |
| 5,556,059 | * 9/1996 | Maeda et al. .......................... 248/49 |

FOREIGN PATENT DOCUMENTS

| 42 21 976 | 1/1994 | (DE) . |
| 0 282 389 | 9/1988 | (EP) . |
| 2 616 390 | 12/1988 | (FR) . |
| 2 662 552 | 11/1991 | (FR) . |
| 63-32527 | 8/1988 | (JP) . |
| 8-48146 | 2/1996 | (JP) . |

* cited by examiner

Primary Examiner—Lincoln Donovan
(74) Attorney, Agent, or Firm—Anthony J. Casella; Gerald E. Hespos; Michael J. Porco

(57) ABSTRACT

A wiring harness arranging construction is provided to arrange a wiring harness in a position more toward a passenger compartment than a hinge and a weatherstrip. The construction includes a container casing 10 with a space 10$p$ for accommodating a looped harness, an insertion opening 10$f$ and a withdrawal opening 10$g$ for the harness which are opposed to each other, and a harness fixing portion 10$h$ projecting from the outer surface of the insertion opening 10$f$. After being inserted through the insertion opening 10$f$ and wound around a windup spring 30 inside the casing 10, the wiring harness is withdrawn through the withdrawal opening 10$g$. The container casing 10 is secured to either one of a door and a body, and the wiring harness withdrawn from the container casing 10 is extended to the other of the door and the body and secured thereto by a clamp. Accordingly, the wiring harness can extend and contract while varying the diameter of the loop of its part passed through the container casing as the door is opened and closed.

24 Claims, 27 Drawing Sheets

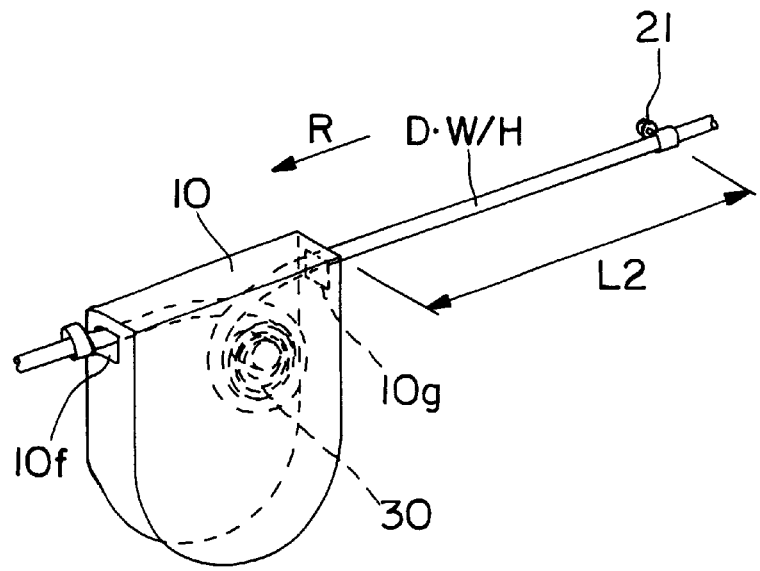
FIG. 7
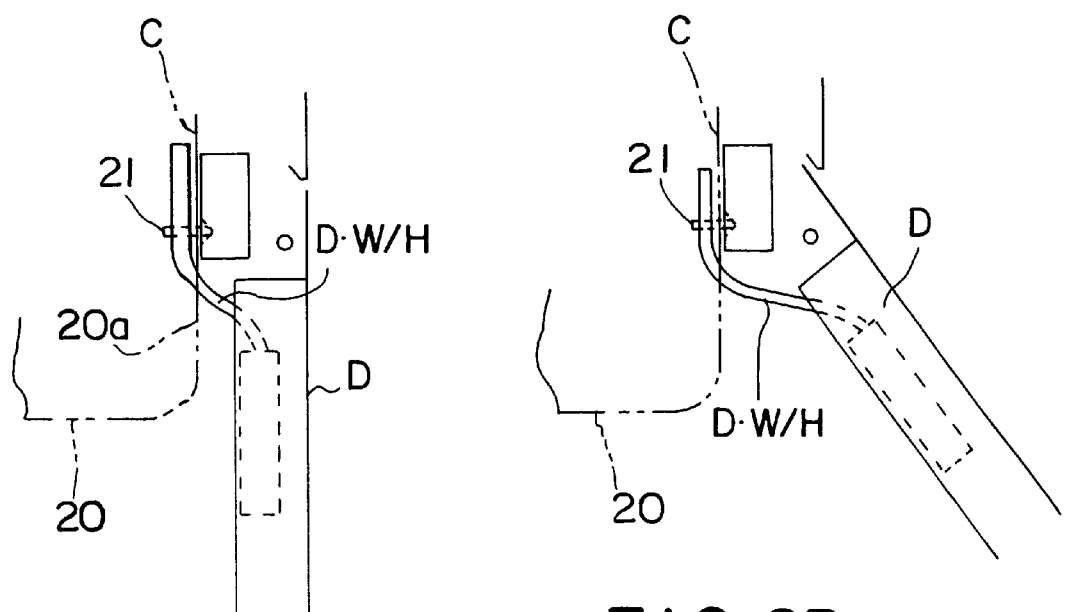
FIG. 8A
FIG. 8B

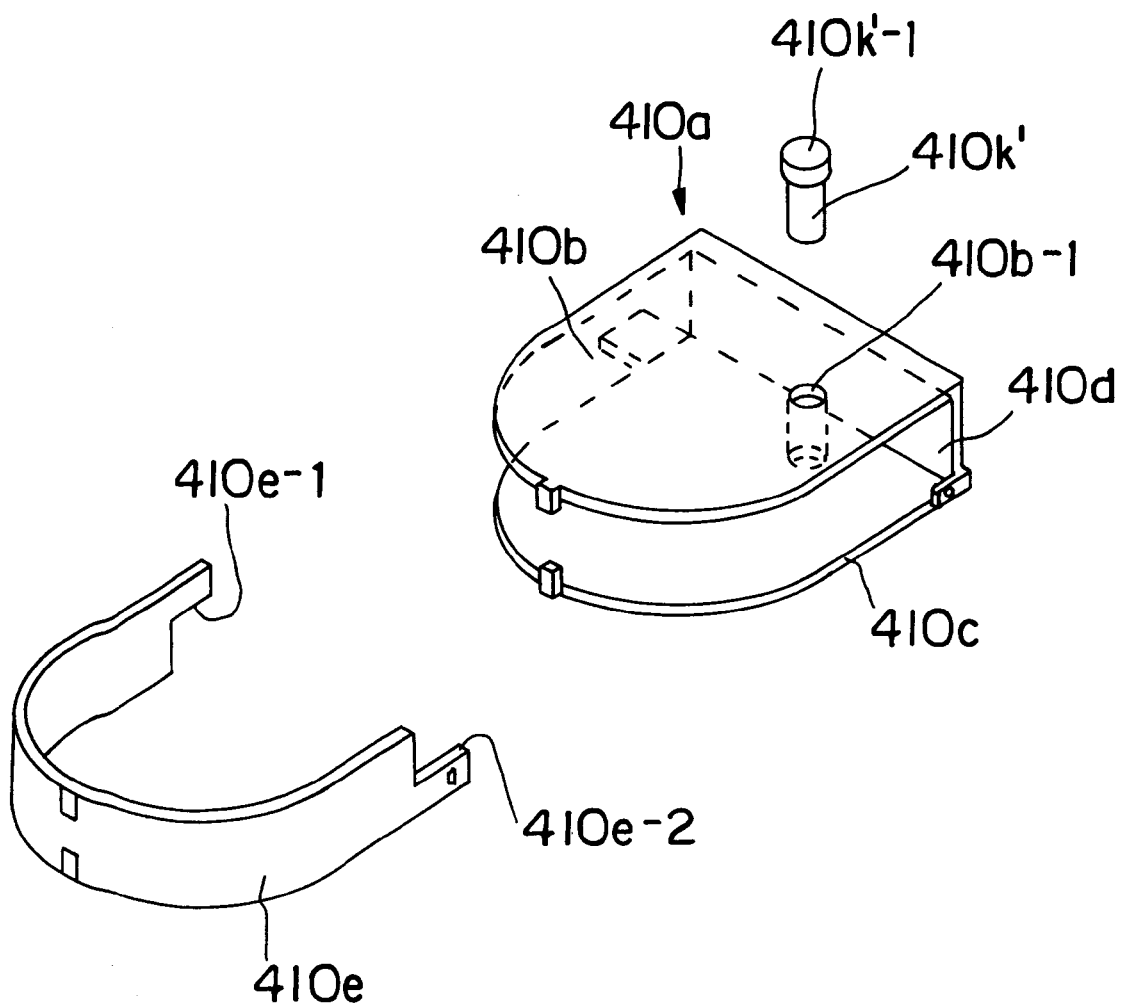
F I G. 37

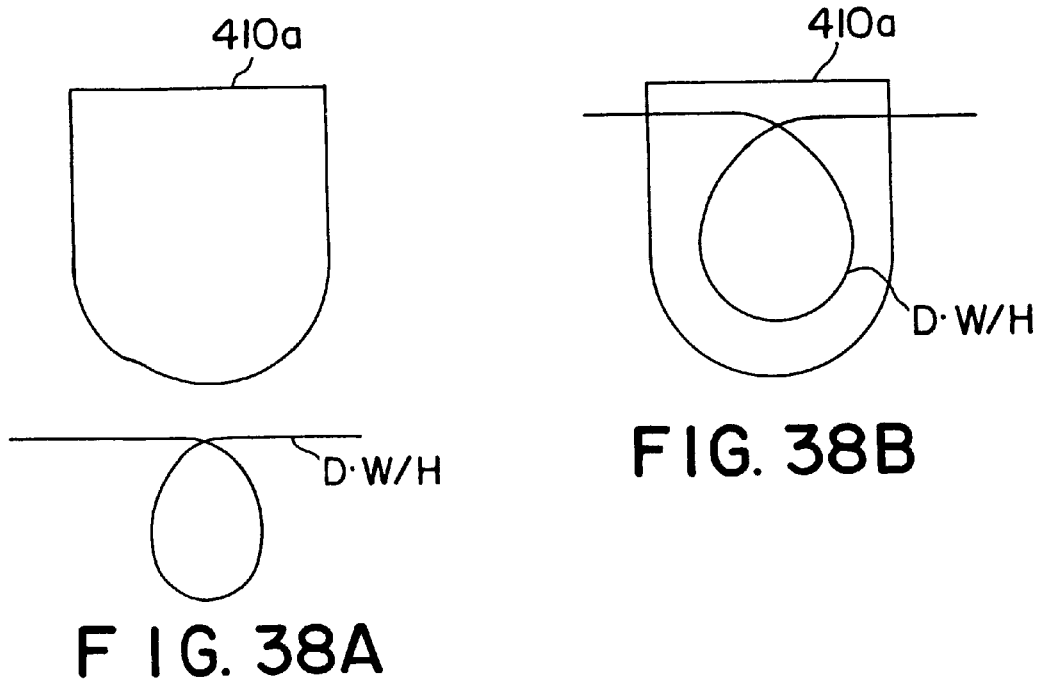
FIG. 38A
FIG. 38B
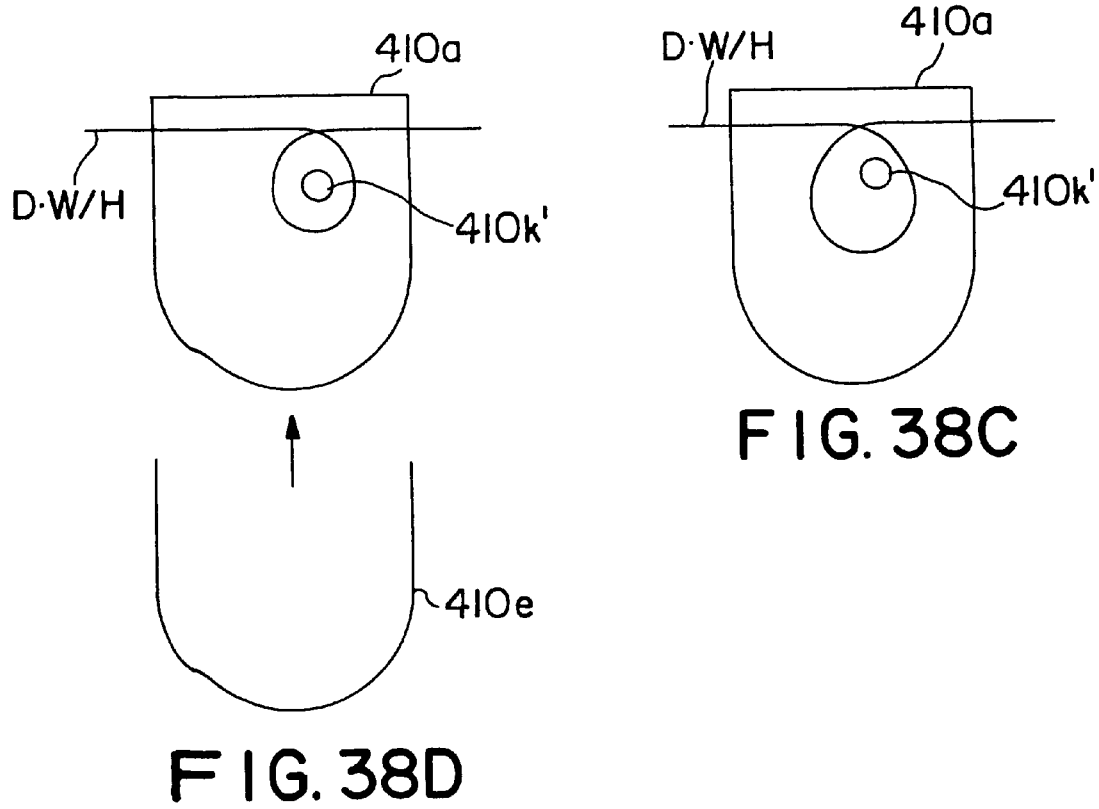
FIG. 38D
FIG. 38C

WIRING HARNESS ARRANGING CONSTRUCTION

RELATED APPLICATIONS

This application is a continuation of U.S. patent appl. Ser. No. 08/997,580, filed Dec. 23, 1997, now U.S. Pat. No. 5,957,702.

BACKGROUND OF THE INVENTION

1. Field of the Invention

The present invention relates to a wiring harness arranging construction, in particular for a door hinge portion of a vehicle, and is particularly designed to facilitate an arrangement operation. Furthermore there is in particular prevented the entrance of water with a simple means by arranging a wiring harness more toward a passenger compartment than a support point of the hinge and more inwardly than a weatherstrip.

2. Description of the Prior Art

A prior art door harness is arranged from a door to a body of a vehicle in a manner that permits the periodic opening and closing of the door. The prior art door harness may be connected with an instrument panel harness (hereinafter, "IP harness") in the body. Alternatively, the IP harness may be arranged from the body to the door, and may be connected with the door harness in the door. Conventionally, the door harness is arranged in the substantially same position as a support position of the door hinge along the horizontal direction, but displaced therefrom along the vertical or height direction. Thus the door harness only twists without extending or contracting as the door is opened and closed. The above twisting is taken up by the twisting of the wiring harness.

FIG. 39 shows a prior art wiring harness arranged at the support position of the hinge. More particularly, a hinge H connects a body C and a door D, and is mounted substantially in the middle of an end surface 1a of a door panel 1, as shown in FIG. 39. A door harness W/H needs to be arranged inside the door panel 1 and is taken outside the door D through a through hole 1b formed in the end surface 1a. It takes time and labor to arrange the wiring harness inside the door panel 1 and pass it through the through hole 1b.

Further, a weatherstrip 2 is mounted on the door D to prevent the entrance of water. The weatherstrip 2 is mounted more toward the passenger compartment than the hinge H. Therefore, the wiring harness W/H is located more away from the passenger compartment than the weatherstrip 2. Accordingly, the weatherstrip 2 cannot fulfill its water preventing function at the location where the wiring harness is arranged, necessitating a water preventing construction for the wiring harness W/H. In view of this, a conventional practice has been to mount waterproof grommets on the holes formed in the body C and the door D for the arrangement of the wiring harness W/H. Thus a certain measure is taken to make the wiring harness W/H waterproof. However, such a practice is costly and cumbersome.

The above problem can be solved by arranging the wiring harness W/H more toward the passenger compartment than the weatherstrip 2. However, in such a case, since the arrangement position of the wiring harness W/H is displaced from the support position of the hinge along the horizontal direction, the wiring harness W/H needs to be extended and contracted when the door D is opened and closed. In other words, the wiring harness to be arranged in the door hinge portion is required to have both an extendible/contractible function and a twist take-up function.

A construction in which a wiring harness is arranged more toward the passenger compartment than a weatherstrip is disclosed in Japanese Unexamined Patent Publication No. 8(HEI)48146. Specifically, as shown in FIGS. 40 and 41, a corrugated duct 4 for covering an air conditioning duct is mounted between a side cover 3 of an instrument panel and an inner surface 1c of a door opposite to the side cover 3, and a wiring harness W/H spirally wound to have a margin length is arranged inside this duct 4.

Several problems may occur with the prior art spiral wiring harness W/H arranged inside the corrugated duct 4, as shown in FIGS. 40 and 41.

First, when the wiring harness W/H extends in the center of the corrugated duct 4, the corrugated duct 4 and the spiral wiring harness W/H are allowed to extend and contract in a normal manner. However, if a part W of the wiring harness W/H enters a recess of the corrugation of the duct 4, the duct 4 cannot contract. If the door is closed in this state, the duct 4 and the wiring harness W/H may be damaged by being jammed between the door panel and the side cover and, in a worst case, the wire may be cut.

Second the spiral wiring harness W/H is not necessarily constantly restored to its specific configuration after the extension or contraction. If the outer diameter of the wiring harness becomes larger than the inner diameter of the corrugated duct 4, the corrugated duct 4 is destroyed and cannot contract any longer.

Third, since the corrugated duct 4 is exposed to the passenger compartment, it may be deformed by an external force. In such a case, the spiral wiring harness W/H located inside may enter the recess of the duct 4, and accordingly the first problem described above is likely to occur.

Finally, when the door is opened and closed, a force to extend and contract the corrugated duct 4 is needed in addition to a door opening/closing force, disadvantageously making the door heavier for a driver or passenger to open and close it.

To overcome the above problems, it is an object of the present invention to arrange a wiring harness in a position which is more toward a passenger compartment than a support point of a hinge and preferably more inwardly than a weatherstrip, in such a manner as to have both a twist take-up function and an extendible/contractible function, to facilitate an arrangement operation and to prevent the entrance of water with a simple means.

SUMMARY OF THE INVENTION

According to the invention, there is provided a wiring harness arranging construction for a wiring harness to be arranged between a first element and a second element that are movable and/or rotatable with respect to each other. In particular, the wiring harness arranging construction may extend between a vehicle body and a door in a position more toward a passenger compartment than a mount position of a hinge for connecting the vehicle body and the door, and preferably inwardly of a weatherstrip. The wiring harness arranging construction comprises at least one container casing comprising a hollow portion for accommodating a portion of the wiring harness. The container casing further has an insertion opening and a dispensing or withdrawal opening for the wiring harness. A harness fixing portion also is provided on the container casing. The wiring harness is passed in particular through the container casing by being dispensed or fed or withdrawn through the dispensing opening after being inserted through the insertion opening.

The wiring harness arranging construction further has a pull-back or biasing means for producing a biasing force in a direction in which the wiring harness is pulled back into the container casing as the wiring harness is dispensed or withdrawn. The container casing is fixed or mounted or mountable to either one or both of the first and second elements, in particular of the door and the vehicle body, and the wiring harness dispensed or withdrawn from the container casing is extended to the other of the first and second elements, in particular of the door and the vehicle body. As a result, the wiring harness inside the container casing extends and contracts according to the movement and/or rotation of the first and second elements with respect to each other, in particular as the door is opened and closed.

The container casing has a function of extending and contracting the wiring harness. Consequently, the wiring harness can extend and contract as first and second elements are moved and/or rotated with respect to each other, e.g. as the door is opened and closed. Further, since the wiring harness withdrawn from the container casing can twist or bend itself, it can smoothly follow the movement and/or rotation of the first and second elements, as e.g. the opening and closing movements of the door. Further, since the wiring harness may be arranged in a position more inwardly than the hinge position and the weatherstrip, it is not necessary to provide a water preventing means for the wiring harness. This obviates the need to use grommets or like conventional water preventing devices. Furthermore, since the wiring harness may be arranged at the side of the inner surface of the inner plate of the door panel, a conventionally required operation of arranging the wiring harness inside the door panel and withdrawing it through the through hole formed in the front end surface of the door panel can be eliminated. As a result, an operation of arranging the wiring harness into the door panel can be considerably made easier as compared with the prior art.

According to a preferred embodiment of the invention, the pull-back means comprises a spring means (e.g. an helicoidal spring arranged on a portion, preferably a loop portion of the wiring harness and/or a windup spring arranged on the container casing and acting on the wiring harness) and/or a self-restoring member being open or non-closed in a circumferential direction around the wiring harness (e.g. being gutter-like and arranged on the outside portion of the wiring harness or being rod-like and arranged in a substantially inner part of the wiring harness). In particular the self-restoring member is not a tube-shaped elastic member.

According to a further preferred embodiment of the invention, the wiring harness is looped at least once inside the container casing between the dispensing opening and the insertion opening. The wiring harness inside the container casing extends and contracts according to the movement and/or rotation of the first and second elements with respect to each other, in particular as the door is opened and closed, while varying the diameter of the loop(s) thereof.

Since the container casing has such a small configuration which only accommodates the wiring harness in a looped state, it can be mounted in a small space. Further, since the container casing is not very much exposed e.g. to the passenger compartment, it does not degrade the appearance. Even if the container casing is mounted on the door, since it is small and lightweight, the mounting of the container casing does not require an increased force to open and close the door, i.e. does not make the door heavier to open and close.

Preferably, the pull-back means comprises a windup spring which is mounted on the container casing. The windup spring preferably is wound around a stopper projection, which projects into the space inside the container casing. A center end of the windup spring may be secured to the stopper projection, and may be biased such that an outermost portion thereof substantially extends toward or along the inner surface of the container casing in its expanded state while defining a harness insertion or passage space with the inner surface of the container casing. The wiring harness is passed through the container casing by being inserted through the insertion opening and dispensed through the dispensing opening after being passed, preferably looped at least once, along the outer surface of the windup spring inside the harness insertion space. The wiring harness is returned or pulled-back into the container casing by a biasing force of the windup spring to make its diameter larger.

According to a further preferred embodiment, there is provided a wiring harness arranging construction for a wiring harness to be arranged between a vehicle body and a door in a position more toward a passenger compartment than a mount position of a hinge for connecting the vehicle body and the door and a weatherstrip. The wiring harness arranging construction comprises a container casing comprising a space for accommodating a looped wiring harness. Insertion and withdrawal openings for the wiring harness are opposed to each other in the casing. A harness fixing portion projects from the outer surface of the withdrawal or insertion opening, and a stopper projection projects into the space inside the container casing. A windup spring is wound around the projection after having a center end thereof secured to the projection. The windup spring is biased such that an outermost portion thereof extends along the inner surface of the container casing in its expanded state while defining a harness insertion space with the inner surface of the container casing. The wiring harness is passed through the container casing by being inserted through the insertion opening and withdrawn through the withdrawal opening after being looped once along the outer surface of the windup spring inside the space. The container casing is fixed to either one of the door and the vehicle body. The wiring harness that is withdrawn from the container casing is extended to the other of the door and the vehicle body and is secured thereto by a clamp. Thus the wiring harness inside the container casing is withdrawn while making the diameter of the windup spring smaller as the door is opened, and is returned into the container casing by a biasing force of the windup spring to make its diameter larger when the door is closed, thereby extending and contracting as the door is opened and closed.

The container casing acts as a so-called harness spool, and is comprised of a main body and a lid which are integrally or unitarily formed e.g. of resin. The main body and the lid are connected via a thin hinge. The insertion and withdrawal openings are formed e.g. by cutting away portions of opposite side surfaces of the main body. The wiring harness is accommodated in the container casing by being withdrawn through the withdrawal opening after being passed through the insertion opening and looped once. Thereafter, the lid is or may be closed to engage a lock portion and an engaging portion provided in corresponding positions of the main body and the lid.

If the container casing through which the wiring harness is passed is fixed to the door, the wiring harness looped inside the container casing is withdrawn as the door is opened, thereby extending the wiring harness. At this time, the wiring harness biased by the windup spring in such a direction as to make the diameter of the loop larger is withdrawn while making the diameter of the windup spring smaller. Since the wiring harness withdrawn from the container casing is free to twist or bend, it extends while twisting. Accordingly, the wiring harness can follow an opening movement of the door. On the other hand, as the door is closed, the wiring harness is pushed by the door and is returned into the container casing by the extended length since it is secured at the insertion opening side of the container casing. At this time, since a biasing force for restoring the windup spring to its original state with a larger diameter acts, the wiring harness is quickly returned into the container casing and is accommodated while being looped with an original large diameter. Since the returning speed of the wiring harness is set faster than the closing speed of the door, the wiring harness does not get jammed between the door and the vehicle body.

Further, since the wiring harness is or may be wound around the stopper projection via the windup spring, it is kept wound around the projection inside the container casing even if the door is opened at a maximum angle and the wiring harness is extended at maximum. Thus, the wiring harness does not extend straight in the container casing and, therefore, the wiring harness can be returned smoothly into the container casing.

A fixing position of the container casing to the door is or may be a recess formed in an inner surface of a door inner plate or a trim at a passenger compartment side, whereas a fixing position of the container casing to the vehicle body is an end surface of the instrument panel facing the door or a pillar provided at a lower side surface of the instrument panel. The mount position of the container casing is not limited to the above positions. The container casing may be mounted on the end surface of the door facing the vehicle body or on the end surface of the vehicle body facing the door.

If, for example, the container casing is mounted on the inner surface of the door inner plate, the wiring harness needs not be arranged inside the door, making the wiring harness arrangement operation easier. Further, if the container casing is mounted on the instrument panel, it can be mounted easily as compared with a case where it is mounted on the vehicle body.

Preferably, a speed at which the wiring harness is returned into the container casing by the pull-back means, preferably the windup spring, is set faster than a closing speed of the door.

Accordingly there can be prevented, that the wiring harness is stuck or trapped or squeezed between the first and second elements, e.g. between a door and a vehicle body.

Further preferably, the pull-back means comprises a substantially arcuate spring piece which has one end thereof secured to the container casing, preferably a stopper projection arranged inside thereof. The spring piece is biased such that an outer portion thereof extends toward or along an inner surface of the container casing in its expanded state while defining a harness insertion or passage space with the inner surface of the container casing. The wiring harness is passed through the container casing by being inserted through the insertion opening and dispensed through the dispensing opening after passing, preferably being looped at least once, along the outer surface of the spring piece inside the harness insertion space. The wiring harness inside the container casing is dispensed against a biasing force of the spring piece and is pulled-back or returned into the container casing by the biasing force of the spring piece.

Most preferably, the leading end of the arcuate spring piece is thinned so as not to exert a load on the wiring harness.

Accordingly a risk of a damage of the wiring harness by the force exerted by the spring piece is reduced. Furthermore due to the thinned portion, the spring piece can smoothly follow the movement of the wiring harness and does not damage the wiring harness.

According to a further preferred embodiment, there is provided a wiring harness arranging construction for arranging a wiring harness between a vehicle body and a door in a position more toward a passenger compartment than a mount position of a hinge for connecting the vehicle body and the door and more toward the passenger compartment than a weatherstrip.

The wiring harness arranging construction comprises a container casing comprising a space for accommodating a looped wiring harness. Insertion and withdrawal openings are provided in the container casing for the wiring harness and which are opposed to each other. A harness fixing portion projects from the outer surface of the insertion opening, and a stopper projection projecting into the space inside the container casing. An arcuate spring piece (acting as a pull-back means) has one end secured to the projection, and is biased such that an outer portion thereof extends along the inner surface of the container casing in its expanded state while defining a harness insertion space with the inner surface of the container casing. The wiring harness is passed through the container casing by being inserted through the insertion opening and withdrawn through the withdrawal opening after being looped once along the outer surface of the spring piece inside the space. The container casing is fixed to either one of the door and the vehicle body and the wiring harness withdrawn from the container casing is extended to the other of the door and the vehicle body and secured thereto by a clamp. Thus the wiring harness inside the container casing is withdrawn against the biasing force of the spring piece as the door is opened, and is returned into the container casing by the biasing force of the spring piece when the door is closed, thereby permitting the wiring harness to extend and contract as the door is opened and closed.

If the container casing through which the wiring harness is passed is fixed to the door, the wiring harness looped inside the container casing is withdrawn as the door is opened, extending. At this time, the wiring harness biased by the spring piece in such a direction as to make the diameter of the loop larger is withdrawn against the biasing force of the spring piece. Since the wiring harness withdrawn from the container casing is free to twist, it extends while twisting. Accordingly, the wiring harness can follow an opening movement of the door. On the other hand, as the door is closed, the wiring harness is pushed by the door and is returned into the container casing by the extended length since it is secured at the insertion opening side of the container casing. At this time, since a biasing force of the spring piece for returning to its original state acts, the wiring harness is quickly returned into the container casing and is accommodated while being looped with an original large diameter.

Further, since the wiring harness is wound around the stopper projection via the spring piece mounted on the stopper projection, it is kept wound around the projection inside the container casing even if the door is opened at a maximum angle and the wiring harness is extended at maximum. Thus, the wiring harness does not extend straight in the container casing and, therefore, the wiring harness can be smoothly returned into the container casing.

Preferably, the leading end of the arcuate spring piece is thinned so as not to exert a load on the wiring harness and a speed at which the wiring harness is returned into the container casing by the spring piece is set faster than a closing speed of the door.

Since the returning speed of the wiring harness is set faster than the closing speed of the door, the wiring harness does not get jammed between the door and the vehicle body.

According to a further preferred embodiment, the pull-back means comprises a spring seat mounted on the wiring harness, preferably on the outer surface thereof, and a spring mounted on the wiring harness between the spring seat and the dispensing opening of the container casing.

Particularly, when the first and/or second elements are moved and/or rotated, e.g. when the door is closed, the pull-back means including the spring produces a biasing force in the direction in which the wiring harness is pulled back into the container casing. Thus, the wiring harness can follow the movement of the wiring harness more smoothly.

Preferably, there is provided a wiring harness arranging construction for arranging a wiring harness between a vehicle body and a door in a position more toward a passenger compartment than a mount position of a hinge that connects the vehicle body and the door and more toward the passenger compartment than a weatherstrip. The wiring harness arranging construction comprises a container casing with a hollow portion for accommodating a looped wiring harness. An insertion opening and a withdrawal opening for the wiring harness are opposed to each other, and a harness fixing portion projects from the outer surface of the insertion opening. The wiring harness passes through the container casing by being withdrawn through the withdrawal opening after being inserted through the insertion opening and looped inside the container casing. A pull-back means is provided for producing a biasing force in a direction in which the wiring harness is pulled back into the container casing as the wiring harness is withdrawn. The pull-back means comprises a spring seat mounted on the outer surface of the wiring harness and a spring mounted on the wiring harness between the spring seat and the withdrawal opening of the container casing. The container casing is fixed to either one of the door and the vehicle body and the wiring harness withdrawn from the container casing is extended to the other of the door and the vehicle body and is secured thereto by a clamp, so that the wiring harness inside the container casing extends and contracts as the door is opened and closed while varying the diameter of the loop thereof.

If the container casing through which the wiring harness is passed is fixed to the door, the wiring harness looped inside the container casing is withdrawn as the door is opened, extending. Since the wiring harness withdrawn from the container casing is free to twist, it extends while twisting or bending. Accordingly, the wiring harness can follow an opening movement of the door. At this time, in the container casing, the spring provided between the wiring harness and the withdrawal opening is compressed as the wiring harness is withdrawn, and a biasing force for pulling the wiring harness back into the container casing acts.

On the other hand, as the door is closed, the wiring harness is returned into the container casing by the extended length upon being subjected to the biasing force of the spring in the pull-back direction and is consequently accommodated therein with looped substantially with an original large diameter. A speed at which the wiring harness is restored to its original shape by the spring is preferably set faster than a closing speed of the door. By making the returning speed of the wiring harness faster, the jamming of the wiring harness between the door and the vehicle body when the door is closed can be prevented.

Preferably, the wiring harness arranging construction further comprises a stopper projection provided inside the container casing, wherein the wiring harness is preferably accommodated with looped at least once around the projection, so that the dispensing of the wiring harness is stopped with the wiring harness wound around the stopper projection when the wiring harness is dispensed from the container casing by a length more than a predetermined or predeterminable length.

In other words, even if the door is opened at a maximum angle and the wiring harness is extended at maximum, the wiring harness is kept wound around the projection inside the container casing. Thus, the wiring harness does not extend straight in the container casing and, therefore, the wiring harness can be smoothly returned into the container casing.

Most preferably, the pull-back means comprises a tube, formed preferably of nylon, being arranged on a portion of the wiring harness, preferably a looped portion thereof, inside the container casing and being trained to be looped with a large diameter so as to have a self-restoring property of returning substantially to its original shape, when a dispensing or withdrawing force acting on the wiring harness is released.

Due to the self-restoring property of the tube the wiring harness is returned into the container casing. Furthermore the tube allows for a simpler reintroduction of the dispensed portion of the wiring harness into the container casing, e.g. by a smooth surface and/or a reduced coefficient of friction.

According to a further preferred embodiment, the pull-back means comprises an auxiliary member made of a flexible and substantially linear elastic member or material which is integrally or unitarily assembled with a portion of the wiring harness to be accommodated in the container casing, preferably so as to be located along the looped portion of the wiring harness, the restoring force of the auxiliary member causing a biasing force to act on the wiring harness in a pull-back direction into the container casing.

Particularly when the door is closed, the biasing force acts in the direction in which the wiring harness is pulled back into the container casing by the restoring force of the auxiliary member made of a flexible and linear elastic member. Accordingly, the wiring harness can follow the movement of the door more smoothly.

Preferably, the wiring harness arranging construction for arranging a wiring harness between a vehicle body and a door in a position more toward a passenger compartment than a mount position of a hinge for connecting the vehicle body and the door and a weatherstrip, comprises more toward the passenger compartment than a container casing will a hollow portion for accommodating a looped wiring harness. An insertion opening and a withdrawal opening for the wiring harness are opposed to each other on the container casing, and a harness fixing portion projects from the outer surface of the insertion opening. The wiring harness is passed through the container casing by being withdrawn through the withdrawal opening after being inserted through the insertion opening and looped inside the container casing. An auxiliary member made of a flexible and linear elastic member is integrally assembled with a portion of the wiring harness that is accommodated in the container casing so as to be located along the looped portion of the wiring harness. The restoring force of the auxiliary member causes a biasing force to act on the wiring harness in a pull-back direction into the container casing. The container casing is fixed to either one of the door and the vehicle body. The wiring harness that is withdrawn from the container casing is extended to the other of the door and the vehicle body and secured thereto by a clamp. Thus the wiring harness inside the container casing changes a diameter of its loop as the door is opened and closed, thereby extending and contracting to follow the movement of the door.

If the container casing through which the wiring harness is passed is fixed to the door, the wiring harness looped inside the container casing is withdrawn as the door is opened, extending. Since the wiring harness withdrawn from the container casing is free to twist, it extends while twisting. Accordingly, the wiring harness can follow an opening movement of the door. At this time, inside the container casing, the diameter of the loop of the auxiliary member integrally mounted to the wiring harness becomes smaller together with the diameter of the loop of the wiring harness as the wiring harness is withdrawn, with the result that a biasing force in a direction in which the wiring harness is pulled back into the container casing acts.

On the other hand, as the door is closed, the wiring harness is returned into the container casing by a length it extended following the closing movement of the door by the biasing force in the pull-back direction caused by the restoring force of the auxiliary member integrally assembled with the wiring harness inside the container casing. As a result, the wiring harness is accommodated while being looped with an original large diameter. A speed at which the wiring harness is restored to its original shape by the restoring force of the auxiliary member is preferably set faster than a closing speed of the door. By setting the returning speed of the wiring harness faster, the jamming of the wiring harness between the door and the vehicle body while the door is closed can be prevented.

Preferably, there is further provided a stopper projection which projects from the bottom plate of the main body inside the container casing, and the withdrawal of the wiring harness from the container casing is stopped with the wiring harness wound around the projection.

The wiring harness is kept wound around the projection inside the container casing even if the door is opened at a maximum angle and the wiring harness is extended at maximum. Thus, the wiring harness does not extend straight in the container casing and, therefore, the wiring harness can be smoothly returned into the container casing.

The auxiliary member preferably comprises a substantially bar-shaped member which is preferably arranged substantially along the axial center and/or the outer surface of the wiring harness within the container casing and has at least the substantially opposite ends thereof fixed to the wiring harness by a holding means, e.g. by taping. With this construction, since the bar-shaped member can be easily bent in any direction, it can be easily handled and readily looped along the wiring harness.

Further, the auxiliary member may comprise a substantially flat plate member which is arranged substantially along the outer surface of the wiring harness within the container casing and has at least the substantially opposite ends thereof fixed to the wiring harness by holding means, e.g. by taping. Although the substantially flat plate member can be bent only in restricted directions, it can be easily fixed along the outer surface of the wiring harness because of its wide width, thereby stabilizing the looped state of the wiring harness.

Furthermore, the auxiliary member may comprise a gutterlike member, preferably having a C-shaped cross section, which is arranged substantially along the periphery of the wiring harness within the container casing and has at least the opposite ends thereof fixed to the wiring harness by a holding means, e.g. by taping. With this construction, since the wiring harness is covered by the gutterlike member, it does not come into sliding contact with the withdrawal opening when being withdrawn through the withdrawal opening, with the result that the surface of the wiring harness can be protected. Further, the wiring harness can be easily arranged in the auxiliary member by being inserted through an opening of the gutter of the auxiliary member.

According to the invention, there is provided a wiring harness arranging construction, in particular according to one or more of the above described embodiments, for arranging a wiring harness between a first element and a second element being movable and/or rotatable with respect to each other, in particular between a vehicle body and a door in a position more toward a passenger compartment than a mount position of a hinge for connecting the vehicle body and the door and preferably a weatherstrip. The wiring harness arranging construction comprises a container casing with a main body including a bottom plate, a lid and a connecting plate that connects edges of the bottom plate and the lid. The opposite sides of the wiring harness are pulled out through an insertion opening and a withdrawal or dispensing opening which are opposed to the wiring harness at positions on or at the side plate portion and the connecting plate. The container casing has an opening extending substantially from the insertion opening to the dispensing opening at a lateral side of the container casing. The opening is provided for the arrangement of the wiring harness inside the container casing is substantially closeable by a side plate portion of the container casing. The container casing is fixed or mounted or mountable to either one or both of the first and second elements, in particular of the door and the vehicle body. The wiring harness dispensed or withdrawn from the container casing is extended to the other of the first and second elements, in particular of the door and the vehicle body. Thus the wiring harness inside the container casing changes a diameter of its loop as the first and second elements are moved and/or rotated with respect to each other, in particular as the door is opened and closed, thereby extending and contracting to follow the movement and/or rotation of the first and second elements, in particular of the door.

According to a preferred embodiment of the invention, there is provided a wiring harness arranging construction for a wiring harness that is to be arranged between a vehicle body and a door in a position more toward a passenger compartment than a mount position of a hinge for connecting the vehicle body and the door and more toward the passenger compartment than a weatherstrip. The wiring harness arranging construction comprises a substantially semicircular container casing comprising a main body including a substantially semicircular bottom plate, a substantially semicircular lid and a substantially flat connecting plate connecting the substantially linear upper edges of the bottom plate and the lid, and a side plate portion to be mounted along arcuate side surfaces of the bottom plate and the lid. A lock portion is provided between the side plate portion and the main body. The side plate portion is mounted after the wiring harness is inserted into a space between the bottom plate and the lid of the main body through a side opening formed in the side surface of the container casing while being looped once. The opposite sides of the wiring harness are pulled out through an insertion opening and a withdrawal opening which are opposed to the wiring harness at the opposite sides of the side plate portion and the connecting plate. The container casing is fixed to either one of the door and the vehicle body. The wiring harness withdrawn from the container casing is extended to the other of the door and the vehicle body and is secured thereto by a clamp. Thus the wiring harness inside the container casing changes the diameter of its loop as the door is opened and closed, thereby extending and contracting to follow the movement of the door.

Since the container casing is formed with the opening in its side surface, the wiring harness can be easily inserted into the container casing through its side opening with being looped once.

According to another aspect of the invention, there is provided a method for assembling a wiring harness arranging construction, in particular according to one of the embodiments of the invention, in particular for a wiring harness to be arranged between a first element and a second element that are movable and/or rotatable with respect to each other, in particular between a vehicle body and a door in a position more toward a passenger compartment than a mount position of a hinge for connecting the vehicle body and the door and preferably more toward the passenger compartment then a weatherstrip. The method comprises a first step of inserting at least a portion of a wiring harness from a lateral direction (e.g. a direction of bending or looping of the wiring harness), preferably in a looped state or to be arranged in a looped state, into a container casing comprising a main body including a bottom plate, a lid and a connecting plate connecting edges of the bottom plate and the lid. The method proceeds by pulling out opposite sides of the wiring harness through an insertion opening and a withdrawal or dispensing opening, which preferably are substantially opposed. The method continues by substantially closing the container casing, preferably with a side plate portion. The method may conclude with a step of fixing or mounting the container casing to either one or both of the first and second elements, in particular of the door and the vehicle body, such that the wiring harness dispensed or withdrawn from the container casing is or can be extended to the other of the first and second elements, in particular of the door and the vehicle body. Thus the wiring harness inside the container casing preferably changes a diameter of its loop as the first and second elements are moved and/or rotated with respect to each other, in particular as the door is opened and closed, thereby extending and contracting to follow the movement and/or rotation of the first and second elements, in particular of the door.

Preferably, the wiring harness is inserted into the container casing through an opening thereof extending substantially from the insertion opening to the dispensing opening at a lateral side of the container casing, the opening being provided for the arrangement of the wiring harness inside the container casing and being substantially closeable by a side plate portion of the container casing.

Preferably, at least one stopper projection is provided which projects from the bottom plate of the main body inside the container casing, and the wiring harness is passed through the side opening while being wound at least once around the stopper projection.

Alternatively or additionally, a projection insertion hole formed in the lid of the container casing, and a projection member insertable into the projection insertion hole and comprising preferably a large diameter portion provided at the leading end thereof may be provided. The wiring harness is inserted through the side opening of the main body while being looped at least once, and the projection member is inserted into the projection insertion hole such that it is located inside the looped portion of the wiring harness and the large diameter portion preferably engages the lid.

Preferably, a harness fixing portion is provided which projects in a position of the main body, preferably of a side portion thereof, of the container casing or of the insertion opening of the side plate portion, and the harness fixing portion and the wiring harness are fixed by a fixing means, preferably by taping, so that the wiring harness is inserted while being fixed preferably to the insertion opening.

As described above, the wiring harness is inserted into the container casing through the side opening while being wound around the projection and fixed to the insertion opening so as to provide a margin length inside the container casing. If the container casing accommodating the wiring harness is fixed to the door, the wiring harness looped inside the container casing extends as the door is opened. Further, since the wiring harness withdrawn from the container casing can twist itself, its extends while twisting. Thus, the wiring harness can follow the opening movement of the door. On the other hand, when the door is closed, the wiring harness is pressed by the door being closed and returns into the container casing by the extended length since it is fixed at the insertion opening of the container casing. As a result, the wiring harness is accommodated while being looped with an original large diameter.

Preferably, the wiring harness to be located inside the container casing is covered by a tube preferably formed of nylon having a smooth outer surface and a function of returning to its original state with a large diameter of the loop, and the wiring harness is pulled back into the container casing by returning to its original state with the large diameter of the loop from its withdrawn state obtained while the door is opened by the restoring force of the tube when the door is closed.

Most preferably, the insertion hole and/or the dispensing or withdrawal hole is/are formed or defined by one or more recesses formed in the side plate portion in cooperation with the bottom plate, the lid and/or the connecting plate.

The wiring harness is covered by the tube having a smooth outer surface because it needs to smoothly move inside the container casing. The tube also has a self-restoring force of automatically returning to its original shape obtained when the wiring harness is accommodated in the container casing while being looped with a large diameter. This tube may be, for example, a nylon tube of a specified thickness. Specifically, the wiring harness is covered by a tube which is so trained as to return to its original looped state from its extended state when a pulling force is released. A speed at which the tube is restored to its original shape is preferably set faster than a closing speed of the door. By making the returning speed of the wiring harness faster, the jamming of the wiring harness between the door and the vehicle body when the door is closed can be prevented. Instead of being covered by the tube, a spring may be fitted on the wiring harness or a windup spring or the like may be mounted on the projection around which the wiring harness is wound.

As described above, if the wiring harness is wound around the stopper projection inside the container casing, the withdrawal is stopped with the wiring harness wound around the projection when the wiring harness is withdrawn from the container casing. In other words, the wiring harness is kept wound around the projection inside the container casing even if the door is opened at a maximum angle and the wiring harness is extended at maximum. Thus, the wiring harness does not extend straight in the container casing and, therefore, the wiring harness can be smoothly returned into the container casing.

Further preferably, a partition plate is provided inside the container casing to define a space continuous with the insertion opening and a space continuous with the withdrawal opening, so that the wiring harness does not directly cross when being withdrawn through the withdrawal opening after being inserted through the insertion opening and looped once. With this construction, the wiring harness does not get entangled.

A fixing position of the container casing to the door is a recess formed in an inner surface of a door inner plate or a trim at a passenger compartment side, whereas a fixing position of the container casing to the vehicle body is an end surface of the instrument panel facing the door or a pillar provided at a lower side surface of the instrument panel. The mount position of the container casing is not limited to the above positions. The container casing may be mounted on the end surface of the door facing the vehicle body or on the end surface of the vehicle body facing the door.

If, for example, the container casing is mounted on the inner surface of the door inner plate, the wiring harness needs not be arranged inside the door, making the wiring harness arrangement operation easier. Further, if the container casing is mounted on the instrument panel, it can be easily mounted as compared with a case where it is mounted on the vehicle body.

These and other objects, features and advantages of the present invention will become more apparent upon a reading of the following detailed description and accompanying drawings.

BRIEF DESCRIPTION OF THE DRAWINGS

FIG. 7 is a perspective view showing a withdrawn state of the wiring harness when the door is opened.

FIGS. 8(A) and 8(B) are schematic plan views showing positional relationships between the container casing and the wiring harness when the door is closed and opened, respectively.

FIG. 37 is an exploded perspective view of an essential portion of a tenth embodiment.

FIGS. 38(A) to 38(D) are schematic diagrams showing a mount procedure of a wiring harness into a container casing according to the tenth embodiment.

DETAILED DESCRIPTION OF THE PREFERRED EMBODIMENTS

Figure 1:
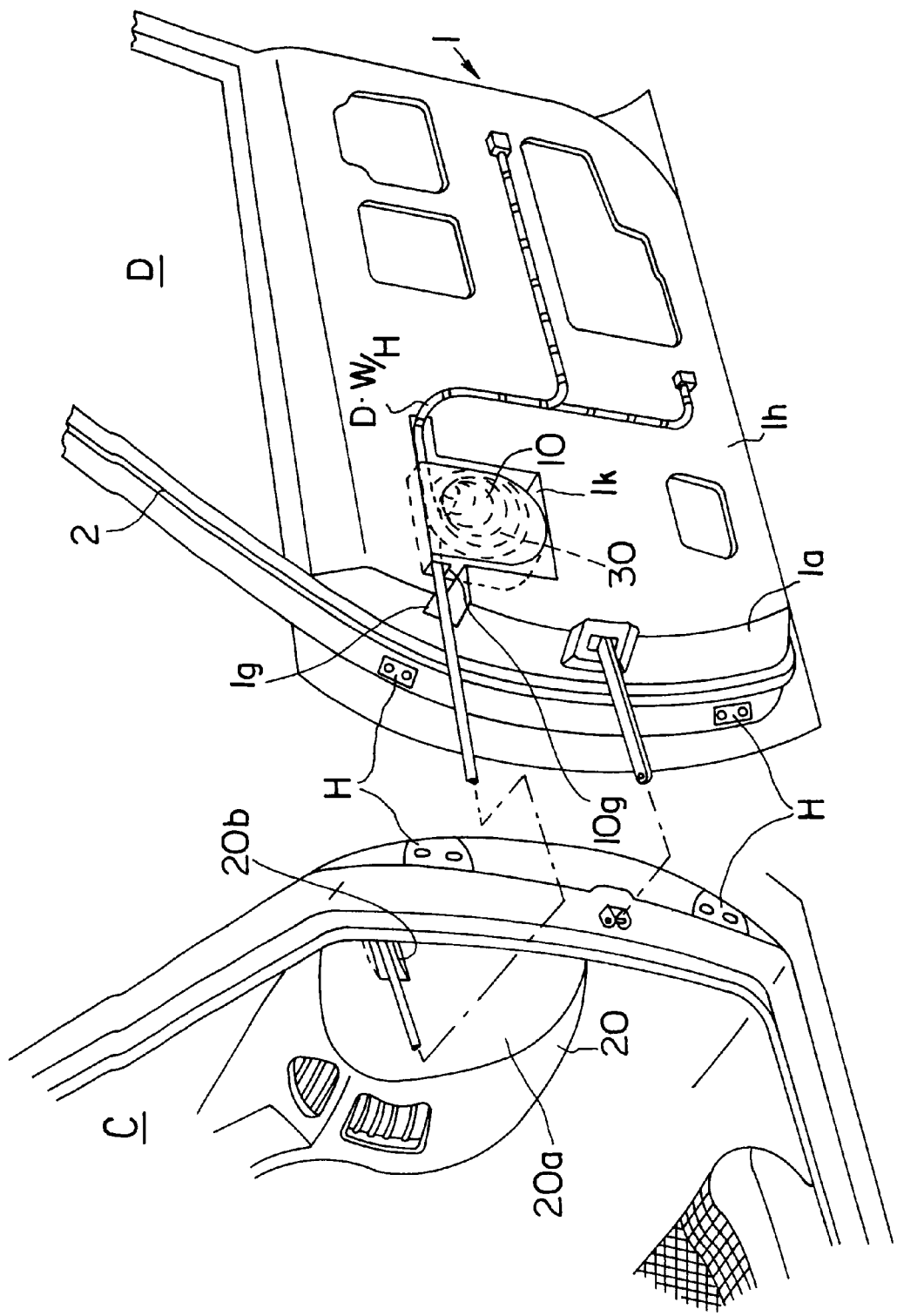
FIG. 1 is a perspective view of a first embodiment of the invention.
Figure 2A:
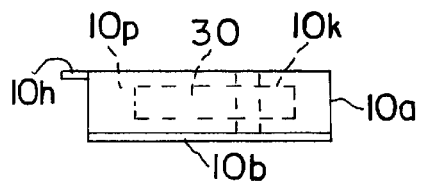
FIGS. 2(A), 2(B) and 2(C) are plan, front and side views of a container casing used in the first embodiment, respectively.
Figure 2B:
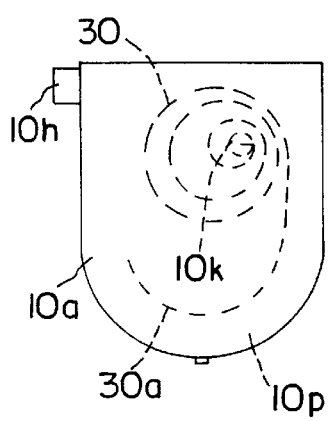
Figure 2C:
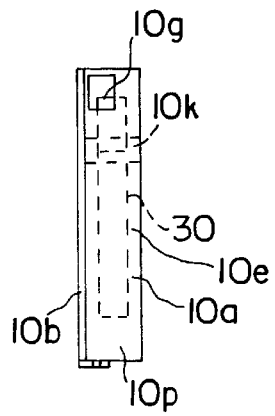
Figure 3:
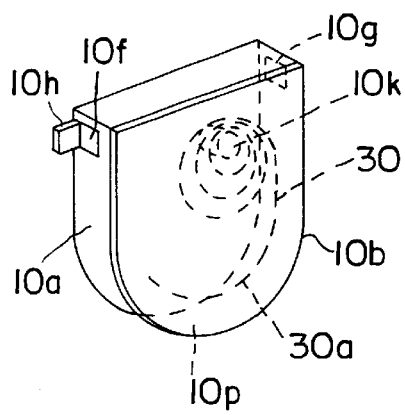
FIG. 3 is a perspective view of the container casing in its closed state.
Figure 4:
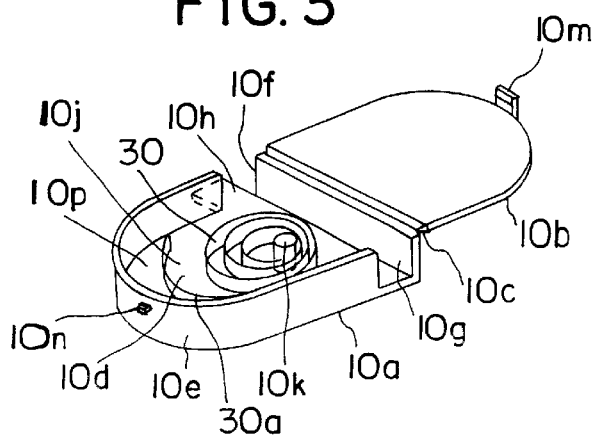
FIG. 4 is a perspective view of the container casing in its opened state.
Figure 5A:
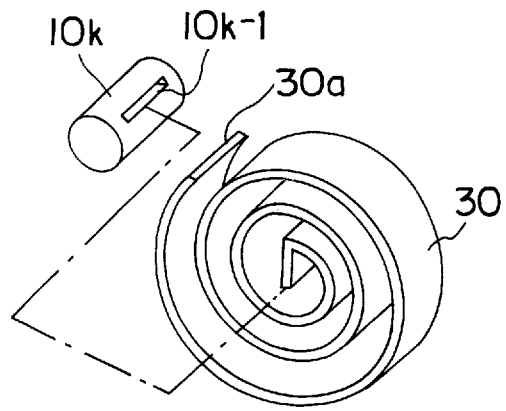
FIG. 5(A) is an exploded perspective view of an essential portion inside the container casing and FIG. 5(B) is a diagram showing a coupled state of the essential portion of FIG. 5(A).
Figure 5B:
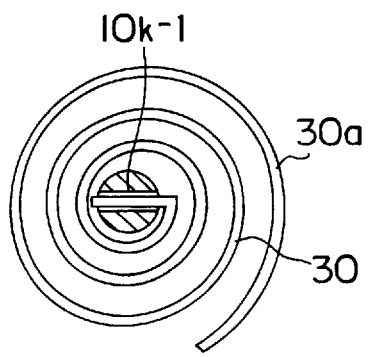

FIGS. 1 to 8 show a first embodiment in which a door harness DW/H is arranged in a door hinge portion between a door D and a body C of a vehicle while extending from a front end surface 1a of a door panel 1 to the body C. After being passed through a container casing 10 configured preferably as shown in FIGS. 2 to 4, a front part of the door harness DW/H arranged in the door hinge portion is or can be pulled toward the body C. In the body C, this front part is inserted or fitted into an instrument panel 20 through an opening 20b formed in a side surface of the instrument panel 20 toward the door D, and is secured or fixed to an inner surface of the instrument panel 20 by a clamp 21 as shown in FIG. 8.

The container casing 10 acts as a so-called harness spool, and is comprised of a main body 10a and a lid 10b which are integrally or unitarily formed e.g. of resin. The main body 10a and the lid 10b are connected via a thin hinge 10c. When the lid 10b is closed, the container casing 10 has a thin box shape having a substantially semicircular cross section which defines a hollow portion 10d in which the door harness DW/H is slidable or insertable.

In the main body 10a of the container casing 10, the opposite ends of a curved side wall 10e are cut away to form an insertion opening 10f and a dispensing or withdrawal opening 10g for the wiring harness which are opposed to each other, and a harness fixing portion 10h preferably projects from the edge of the outer surface at the insertion opening 10f. Further, a cylindrical projection 10k is provided at a bottom portion 10j. A lock portion having a lock hole 10m is provided at or on the leading end of the lid 10b, and a lock claw 10n is provided in such a position of the side surface of the main body 10a to be engageable or interact with the lock hole 10m when the lid 10b is closed.

In the container casing 10, a windup spring 30 is mounted such that its central end is inserted and locked in a lock groove 10k-1 formed in the projection 10k, and is wound around the projection 10k preferably a plurality of times. The windup spring 30 is so biased that its outermost portion 30a expands to a position where it extends along the inner surface of the side wall 10e while defining a harness insertion space 10p therewith. In addition, the windup spring 30 expandably returns to its original position at a faster speed than a closing speed of the door when it is pulled back into the casing 10 after the door harness DW/H is pulled out.

Figure 6:
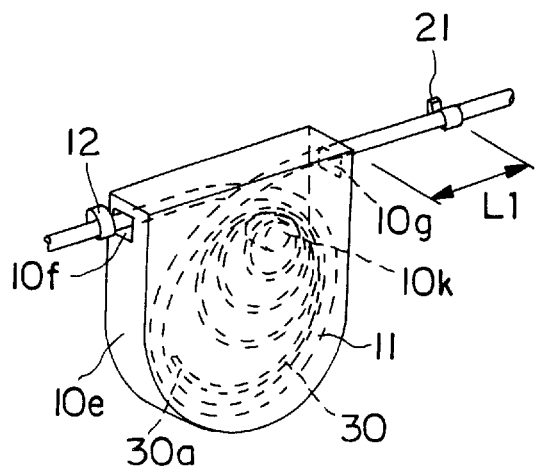
FIG. 6 is a perspective view of the container casing accommodating a wiring harness when a door is closed.

The door harness DW/H is inserted through the insertion opening 10f, and is secured to the harness fixing portion 10h by tape 12, a clamp, a strip or the like fixing means at the entrance of the insertion opening 10f. In the container casing 10, after being looped once so as to surround the windup spring 30 mounted on the projection 10k as shown in FIG. 6, the door harness DW/H is pulled out through the withdrawal opening 10g. At this time, since the outermost portion 30a of the windup spring 30 is spaced from the side wall 10e while defining the harness insertion space 10p as described above, the door harness DW/H is looped with such a large diameter as to extend along the inner surface of the side wall 10e through the space 10p. After the door harness DW/H is passed through the container casing 10 in such a manner as to have a margin length, the lid 10b is closed to engage the lock claw 10n with the lock hole 10m.

On the door panel 1 of the door D on which the container casing 10 is mounted, a weatherstrip 2 is mounted in a position more toward a passenger compartment than a hinge or hinge coupled portion H with the body C as shown in FIG. 1. A notch 1g for the insertion of the door harness DW/H is formed in a corner portion between the end surface 1a and an inner plate 1h of the door panel 1 which is located more toward the passenger compartment than the mount position of the weatherstrip 2, and a recess 1k in communication with the notch 1g is formed in the inner plate 1h. The container casing 10 is preferably tightly fitted in the recess 1k.

The door harness DW/H having its front part inserted through the container casing 10 as shown in FIG. 6 is arranged along the inner surface of the inner plate 1h of the door panel 1. The container casing 10 is fitted in the recess 1k. In this state, the inner plate 1h is covered by a trim panel (not shown) to fix the container casing 10 inside the door D.

The door harness DW/H withdrawn or dispensed from the container casing 10 through the dispensing or withdrawal opening 10g is extended to the body C and, as described above, is secured to the inner surface of the instrument panel 20 by the clamp 21 after being inserted through the opening 20b formed in the side surface 20a of the instrument panel 20. The mount state shown in FIG. 6 is obtained when the door D is closed. At this time, the length of the door harness DW/H from the container casing 10 mounted on the door D to the position where it is secured to the body C is L1 and the length thereof looped inside the container casing 10 is a margin length.

As described above, since the container casing 10 is fitted or accommodated in the recess 1k formed in the position more toward the passenger compartment than the support position of the hinge H and the weatherstrip 2 and the door harness DW/H is extended to the instrument panel 20, the door harness DW/H needs to extend while twisting or extending substantially spiral-like according an opening angle of the door D when the door D is opened. Likewise, the door harness DW/H needs to contract while untwisting when the door D is closed.

When the door D is opened in the closed state shown in FIGS. 6 and 8(A), the door harness DW/H inside the container casing 10 is withdrawn through the withdrawal opening 10g while making the diameter of the loop of the door harness DW/H smaller against the spring force of the windup spring 30. When the door D is fully opened, the length of the door harness DW/H from the container casing 10 to the clamp 21 is extended to L2 as shown in FIGS. 7 and 8(B). The door harness DW/H is withdrawn from the container casing 10 by a difference (L2−L1) between the lengths L2 and L1. In addition, the door harness DW/H is wound around the windup spring 30 which is tightly wound around the projection 10k for stopping the withdrawal of the door harness DW/H with a reduced diameter, thereby preventing any further withdrawal of the door harness DW/H lest the withdrawn door harness DW/H should slacken between the door D and the body C.

As described above, when the door D is opened, the door harness DW/H extends, following the opening movement of the door D. The door harness DW/H withdrawn from the container casing 10 can twist itself and, accordingly, it can extend while twisting or curving.

Since the windup spring 30 around which the door harness DW/H is wound has a self-restoring or elastic property of substantially returning to its original shape, when the door D is moved in its closing direction, the door harness DW/H is returned in a direction R (FIG. 7) into the container casing 10 or contracted at a speed preferably faster than the closing speed of the door D due to the restoring force of the windup spring 30 while making the diameter of the loop larger. Consequently, the door harness DW/H returns to the state of FIG. 6. Since the door harness DW/H smoothly contracts, it can follow the closing movement of the door D and the jamming of the door harness DW/H between the door D and the body C can be prevented.

Figure 9:
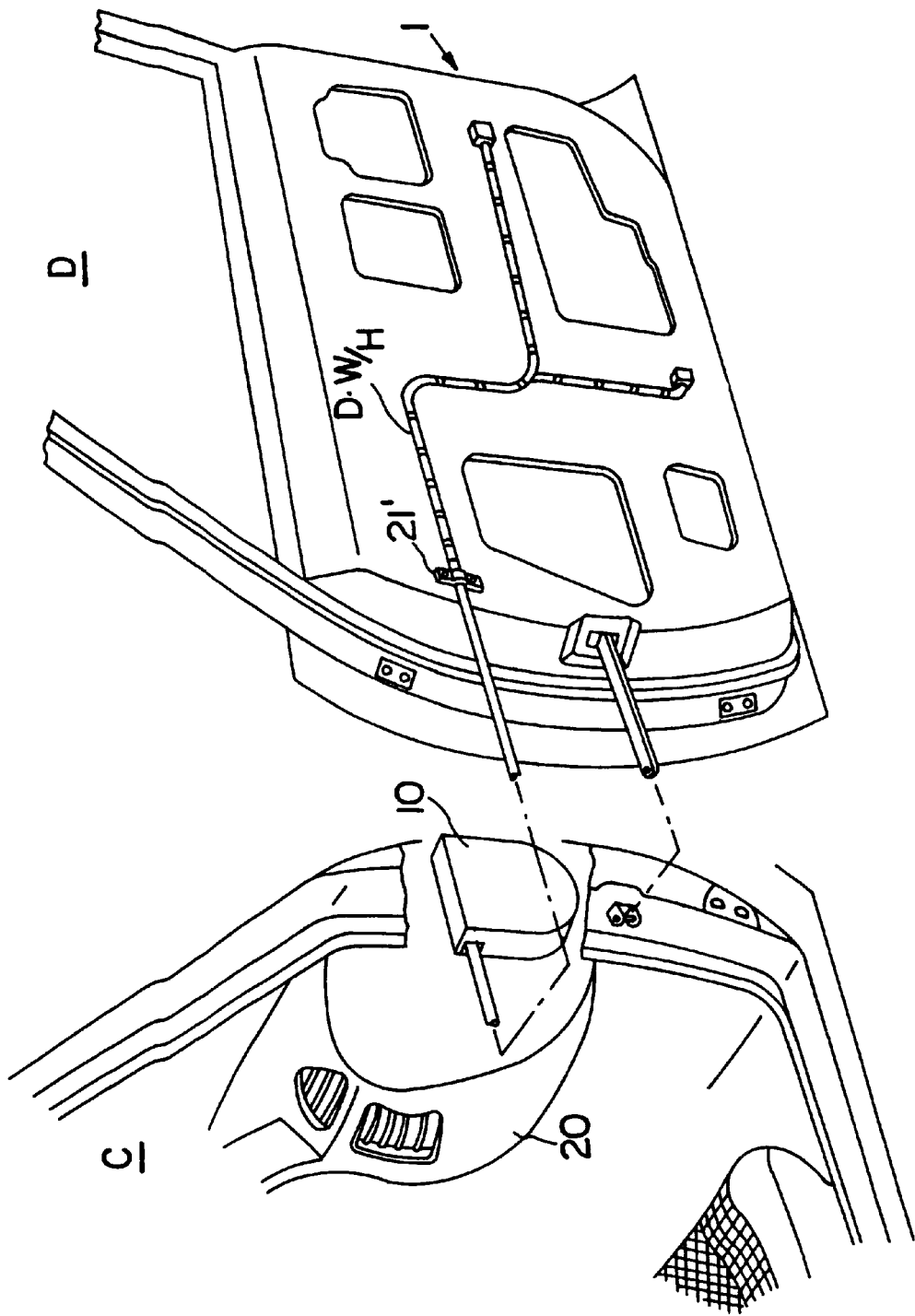
FIG. 9 is a perspective view of a second embodiment.
Figure 10A:
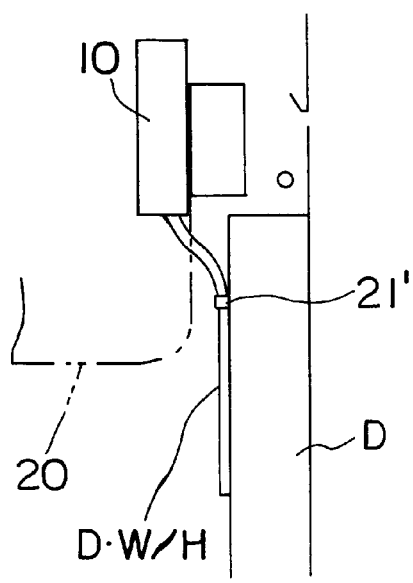
FIGS. 10(A) and 10(B) are schematic plan views showing positional relationships between a container casing and a wiring harness according to the second embodiment when a door is closed and opened, respectively.
Figure 10B:
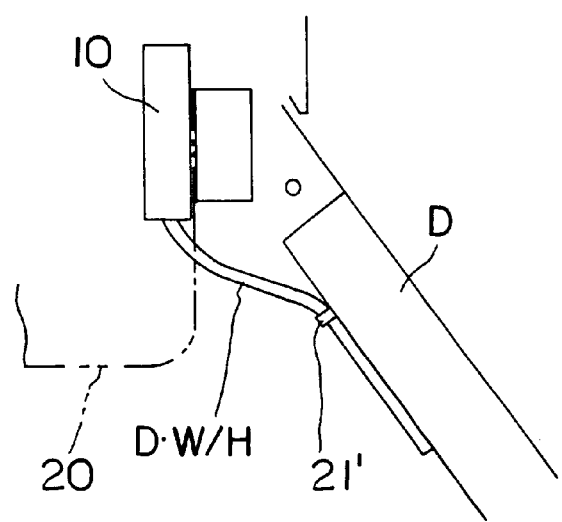
Figure 11:
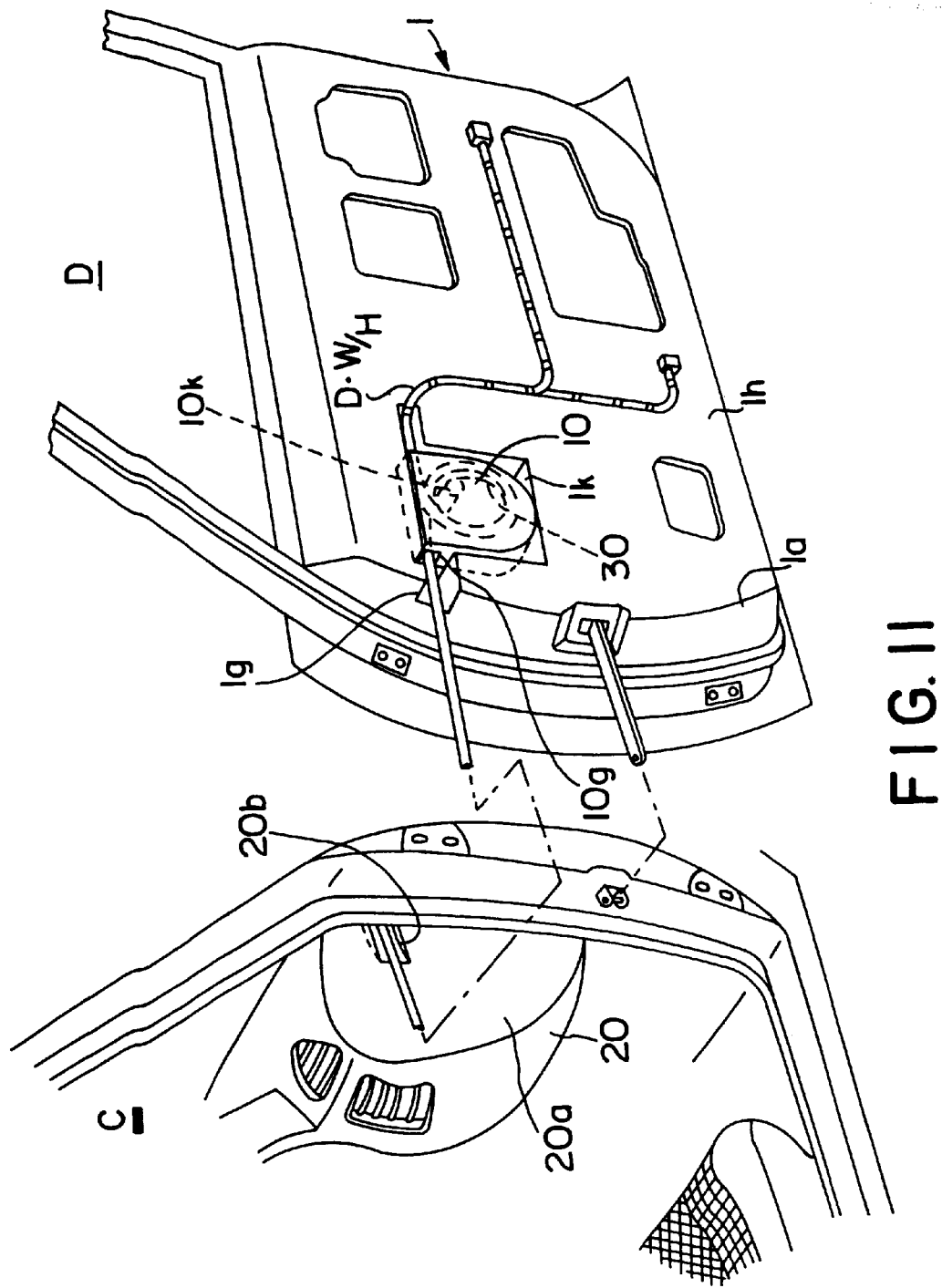
FIG. 11 is a perspective view of a third embodiment of the invention.
Figure 12A:
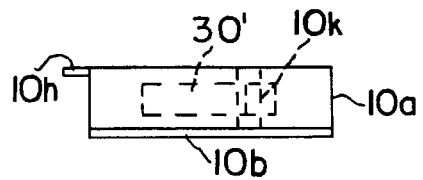
FIGS. 12(A), 12(B) and 12(C) are plan, front and side views of a container casing used in the third embodiment, respectively.
Figure 12B:
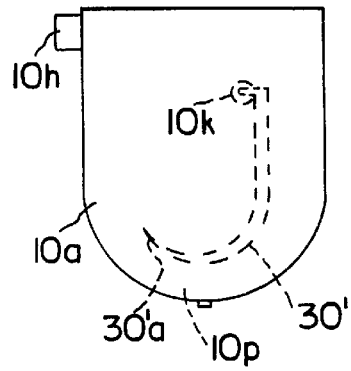
Figure 12C:
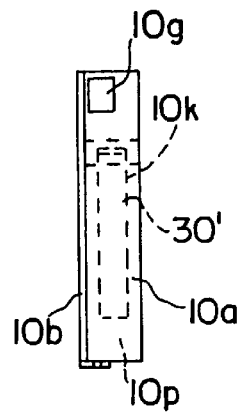
Figure 13:
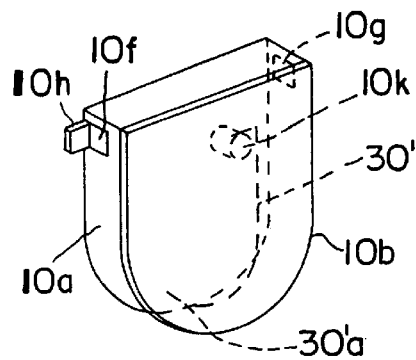
FIG. 13 is a perspective view of the container casing in its closed state.
Figure 14:
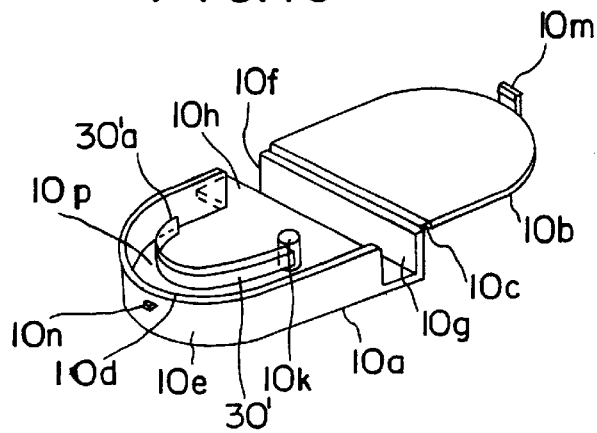
FIG. 14 is a perspective view of the container casing in its opened state.
Figure 15A:
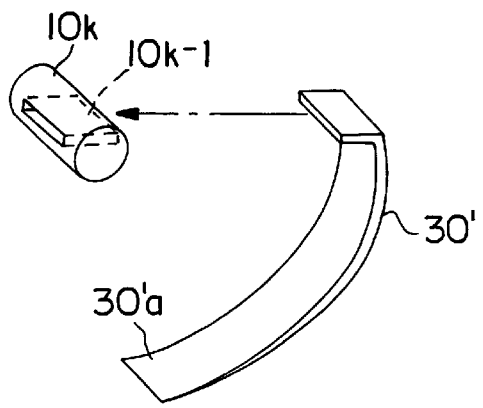
FIG. 15(A) is an exploded perspective view of an essential portion inside the container casing and FIG. 15(B) is a diagram showing a coupled state of the essential portion of FIG. 15(A).
Figure 15B:
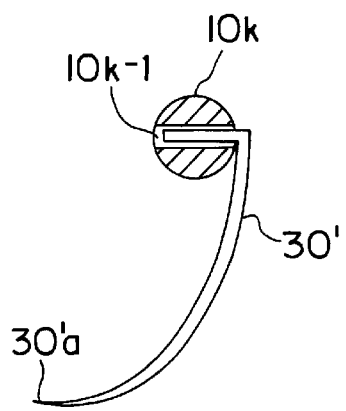

FIGS. 9, 10(A) and 10(B) show a second embodiment, in which a container casing 10 is fixed to the inner surface of a side wall 20a of an instrument panel 20 of a body C toward a door D. Specifically, the container casing 10 is fixed inside the instrument panel 20, and the door harness DW/H extending from the door D is passed through the container casing 10. On the other hand, in the door D, the door harness DW/H is fixed to the inner surface of an inner plate 1h by a clamp 21'. Alternatively, an IP harness may be passed through the container casing 10; extended toward the door D and connected with the door harness DW/H by a connector after being secured to the door D by a clamp.

The action of the second embodiment is similar to that of the first embodiment. When the door D closed as shown in FIG. 10(A) is opened, the door harness DW/H extends while twisting as shown in FIG. 10(B), following the opening movement of the door D. On the other hand, when the door D opened as shown in FIG. 10(B) is closed, the windup spring 30 around which the door harness DW/H is wound returns to the state of FIG. 10(A) and, at the same time, the door harness DW/H is pressed by the door D being closed and contractibly returned into the container casing 10 while making the diameter of the loop larger.

Next a third embodiment will be described with reference to FIGS. 11 to 17. The main difference between the first and third embodiment resides in the fact that a spring piece 30' is used as a pull-back means instead of the wind-up spring 30. Same or similar parts as in the first embodiment are denoted with same or similar reference signs and accordingly a description will be omitted hereinafter.

In the container casing 10 of this embodiment, an arcuate spring piece 30' is mounted such that its central end is inserted and locked in a lock groove 10k-1 formed in the projection 10k, and is arranged in an arcuate manner about the projection 10k a plurality of times. The spring piece 30' is so biased that its outer portion 30'a expands to a position where it extends along the inner surface of the side wall 10e while defining a harness insertion space 10p therewith. In addition, the spring piece 30' expandably returns to its original position at a faster speed than a closing speed of the door when it is pulled back into the casing 10 after the door harness DW/H is pulled out. Further, the leading end 30'a of the arcuate spring piece 30' is thinned.

Figure 16:
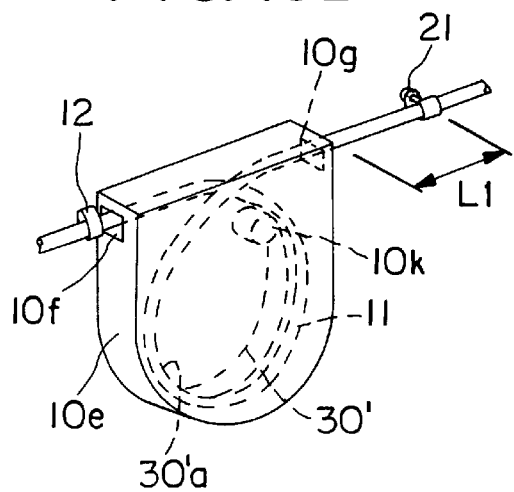
FIG. 16 is a perspective view of the container casing accommodating a wiring harness when a door is closed.
Figure 17:
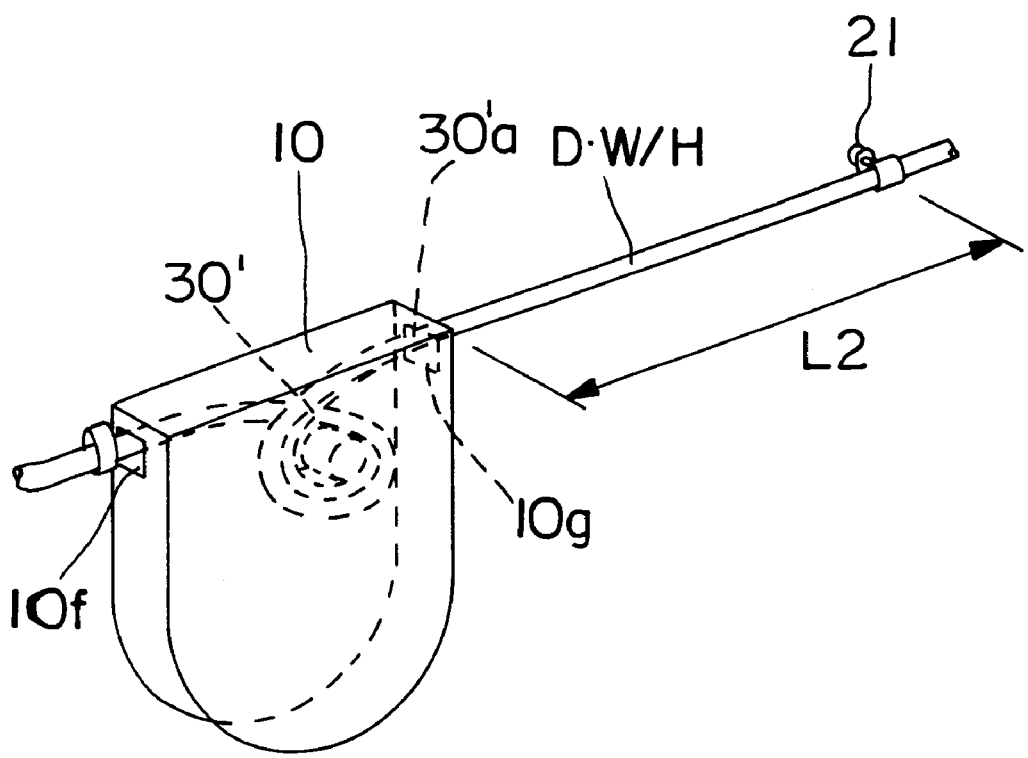
FIG. 17 is a perspective view showing a withdrawn state of the wiring harness when the door is opened.
Figure 18:
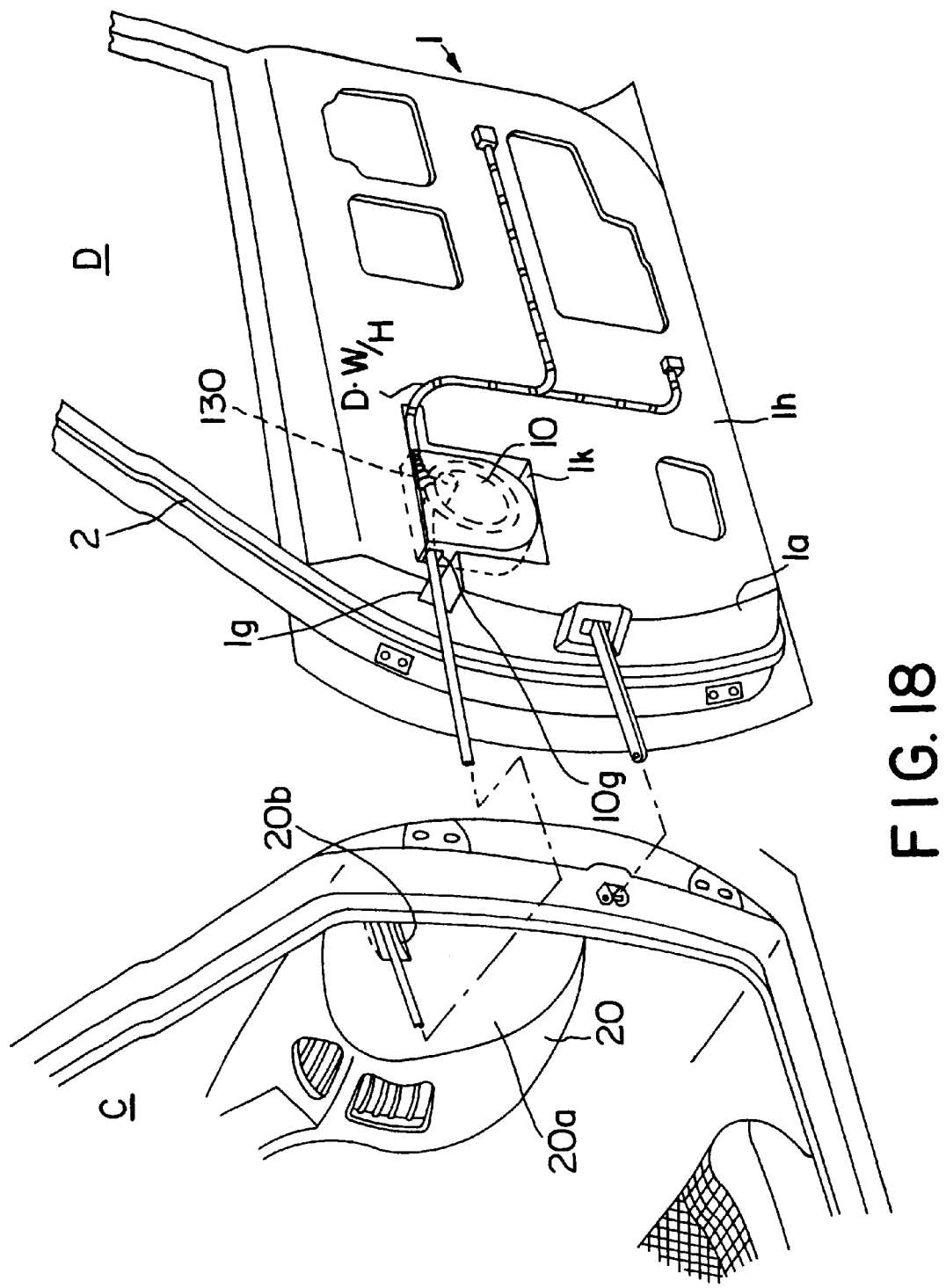
FIG. 18 is a perspective view of a fourth embodiment of the invention.
Figure 19A:
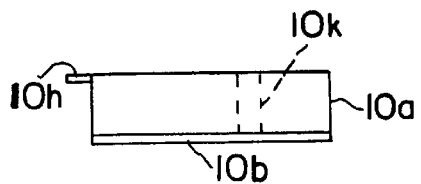
FIGS. 19(A), 19(B) and 19(C) are plan, front and side views of a container casing used in the fourth embodiment, respectively.
Figure 19B:
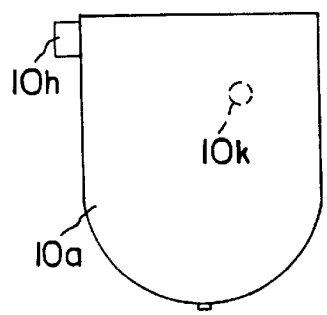
Figure 19C:
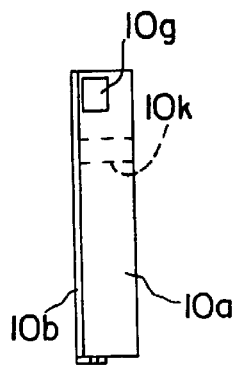
Figure 20:
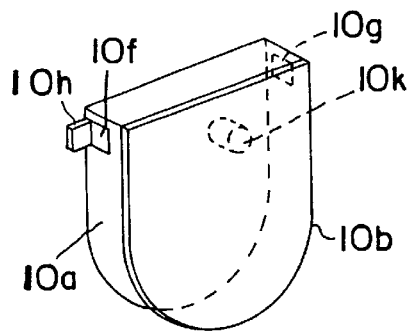
FIG. 20 is a perspective view of the container casing in its closed state.
Figure 21:
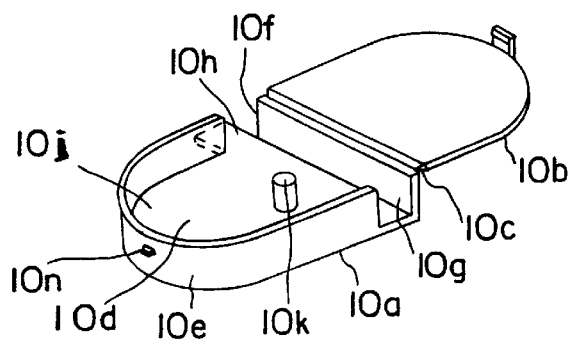
FIG. 21 is a perspective view of the container casing in its opened state.

When the door D is opened in the closed state shown in FIGS. 16 and 8(A), the door harness DW/H inside the container casing 10 curves the spring piece 30' against the spring force of the spring piece 30' and is withdrawn through the withdrawal opening 10g while making the diameter of the loop of the door harness DW/H smaller. At this time, since the leading end 30'a of the spring piece 30' is thinned, it can smoothly follow the movement of the door harness DW/H and does not damage the door harness DW/H. When the door D is fully opened, the length of the door harness DW/H from the container casing 10 to the clamp 21 is extended to L2 as shown in FIGS. 17 and 8(B). The door harness DW/H is withdrawn from the container casing 10 by a difference (L2−L1) between the lengths L2 and L1. In addition, the door harness DW/H is wound around the spring piece 30' which is mounted on the projection 10k for stopping the withdrawal of the door harness DW/H with a reduced diameter, thereby preventing any further withdrawal of the door harness DW/H lest the withdrawn door harness DW/H should slacken between the door D and the body C.

As described above, when the door D is opened, the door harness DW/H extends, following the opening movement of the door D. The door harness DW/H withdrawn from the container casing 10 can twist itself and, accordingly, it can extend while twisting.

Since the spring piece 30' around which the door harness DW/H is wound has a spring force for returning to its original shape, when the door D is moved in its closing direction, the door harness DW/H is returned into the container casing 10 at a speed faster than the closing speed of the door D due to the restoring force of the spring piece 30' while making the diameter of the loop larger. Consequently, the door harness DW/H returns to the state of FIG. 6. At this time as well, the door harness DW/H can be returned without being damaged due to the thinned leading end 30'a of the spring piece 30'. Since the door harness DW/H smoothly contracts, it can follow the closing movement of the door D and the jamming of the door harness DW/H between the door D and the body C can be prevented.

Next a fourth embodiment will be described with reference to FIGS. 18 to 24. Those elements same or similar as those of the preceding embodiments are denoted with same or similar reference signs and accordingly a description thereof will be omitted hereinafter.

Figure 22A:
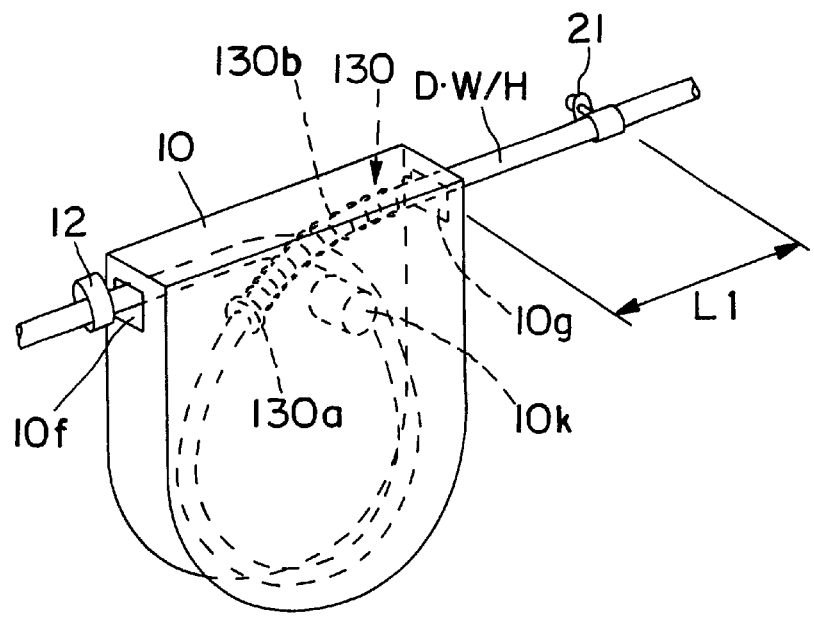
FIG. 22(A) is a perspective view of the container casing with a wiring harness accommodated inside.

In the container casing 10, as shown in FIG. 22(A), the door harness DW/H is inserted through the insertion opening 10f, and is secured to the harness fixing portion 10h by tape 12 at the entrance of the insertion opening 10f. In the container casing 10, after being looped at least once so as to surround the projection 10k, the door harness DW/H is pulled out through the withdrawal opening 10g. At this time, the door harness DW/H is looped with a large diameter so as to substantially extend along the inner surface of the curved side wall 10e, and is preferably trained to be looped with this large diameter.

Figure 22B:
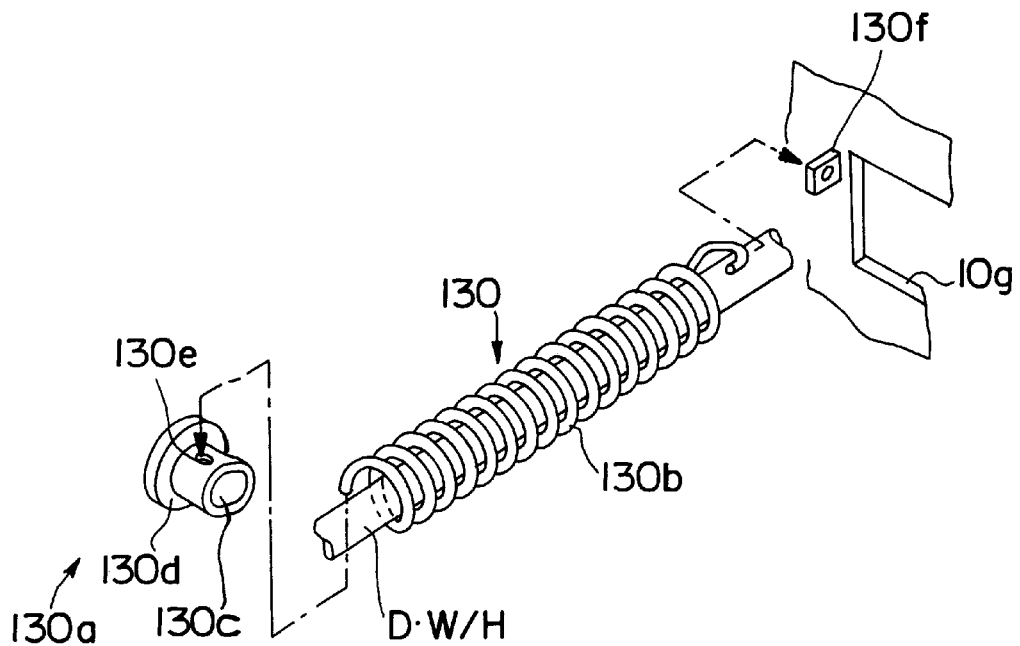
FIG. 22(B) is an exploded diagram of a pull-back means.

In the container casing 10 is provided a pull-back means 130 for producing a biasing force in a pull-back direction against the withdrawal of the door harness DW/H accommodated in the container casing 10. As shown in FIGS. 22(A) and 22(B), the pull-back means 130 is comprised of a spring seat 130a mounted on or fixed to the outer surface of the door harness DW/H and a spring 130b slidably mounted on the door harness DW/H along its length. The spring 130b is preferably provided in a precompressed manner between the spring seat 130a and the inner wall of the withdrawal opening 10g of the container casing 10. The spring seat 130a is an integral or unitary assembly of a tubular fixing portion 130c secured to the outer surface of the door harness DW/H by a fixing means such as tape and a flange-shaped receiving portion 130d. One end of the spring 130b is engaged with a lock hole 130e formed in the fixing portion 130c. On the other hand, the other end of the spring 130b is engaged with a hook 130f projecting from the inner wall of the withdrawal opening 10g. Although the opposite ends of the spring 130b are not necessarily lockingly fixed, it is preferable to prevent the generation of unpleasant sounds caused by the vibration of an automotive vehicle or the like.

A mount position of the spring seat 130a to the door harness DW/H is a position spaced from the withdrawal opening 10g preferably by longer than a length the door harness DW/H is withdrawn or dispensed as the door D is opened in consideration of the extension and contraction of the spring 130b. Accordingly, when the door harness DW/H is withdrawn from the withdrawal opening 10g as the door D is opened, the spring 130b is compressed between the spring seat 130a and the dispensing or withdrawal opening 10g, producing a biasing force for pulling the door harness DW/H back.

After the door harness DW/H is inserted into the container casing 10 while providing a margin length as described above, the lid 10b is substantially closed to engage the lock claw 10n and the lock hole 10m.

Figure 23:
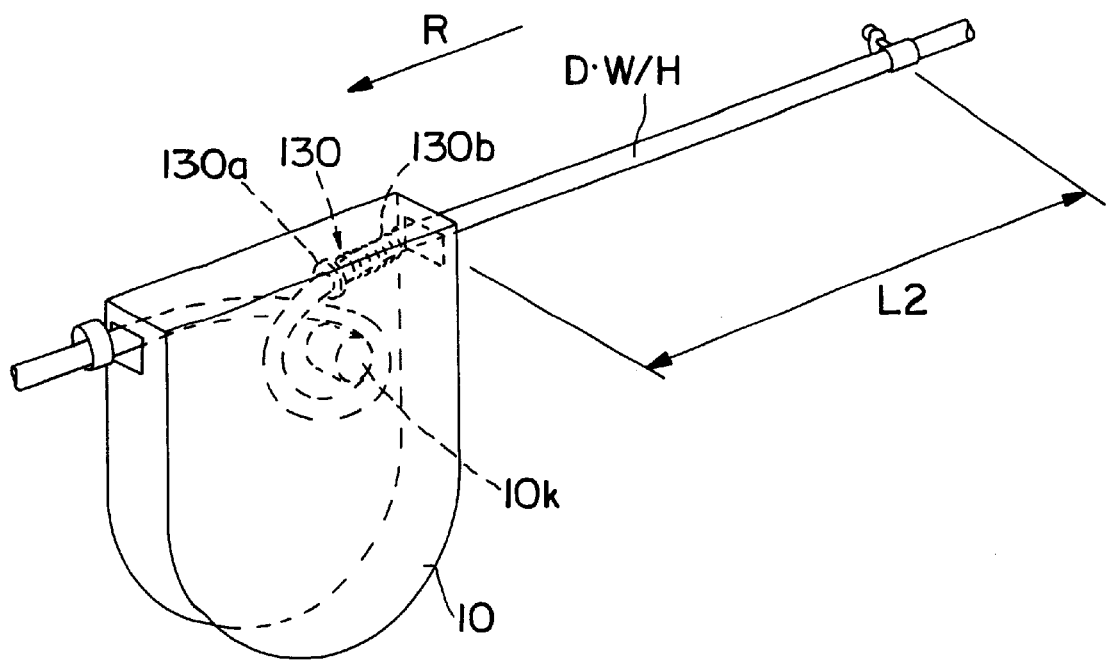
FIG. 23 is a perspective view showing a withdrawn state of the wiring harness when the door is opened.
Figure 24:
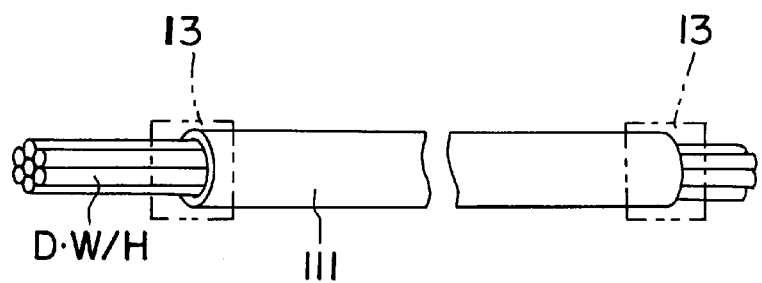
FIG. 24 is a perspective view of the wiring harness to be accommodated in the container casing with a tube mounted thereon.

The door harness DW/H to be accommodated in the container casing 10 may be covered by a tube 11 the opposite ends of which are fixed by tapes 13 as shown in FIG. 24 in order to protect the other surface of the door harness DW/H. Since the tube 11 is made of e.g. a nylon tube having a specified thickness and has a smooth outer surface, it can smoothly move in the container casing 10. The door harness DW/H may be trained to be looped with a large diameter so as to have a self-restoring property of returning to its original shape of FIG. 22 when a pulling force is released with the door harness DW/H withdrawn as shown in FIG. 23. This training helps the biasing force of the spring 130b in pulling the door harness DW/H back. Further, by being covered with the tube 11, the sliding movement of the door harness DW/H inside the container casing 10 does not cause abrasion or friction of the coating thereof.

When the door D is opened in the closed state shown in FIGS. 22(A) and 8(A), the door harness DW/H inside the container casing 10 is withdrawn through the dispensing or withdrawal opening 10g against the direction R (FIG. 23) while making the diameter of the loop of the door harness DW/H smaller. When the door D is substantially fully opened, the length of the door harness DW/H from the container casing 10 to the clamp 21 is extended in the direction R to L2 as shown in FIGS. 23 and 8(B). The door harness DW/H is withdrawn from the container casing 10 by a difference (L2−L1) between the lengths L2 and L1. At this time, since the spring seat 130a mounted on the outer surface of the door harness DW/H moves substantially toward the withdrawal opening 10g in the container casing 10 as the door harness DW/H is pulled out, the spring 130b is compressed, thereby producing a biasing force in a direction in which the door harness DW/H is pulled back into the container casing 10.

Further, in the container casing 10, the door harness DW/H is wound around the projection 10k for stopping the withdrawal of the door harness DW/H, thereby preventing any further withdrawal of the door harness DW/H lest the withdrawn door harness DW/H should slacken between the door D and the body C.

As described above, when the door D is opened, the door harness DW/H extends, following the opening movement of the door D. The door harness DW/H withdrawn from the container casing 10 can twist itself and, accordingly, it can extend while twisting.

When the door D is closed in its opened state, a biasing force of the compressed spring 130b acts on the door harness DW/H in the pull-back direction R in the container casing 10. Accordingly, when the door D is moved in a closing direction, the door harness DW/H is returned into the container casing 10 at a speed preferably faster than a closing speed of the door D due to the restoring force of the spring 130b while making the diameter of the loop larger. Consequently, the door harness DW/H returns to the state of FIG. 22(A). Since the door harness DW/H smoothly contracts, it can follow the closing movement of the door D and the jamming of the door harness DW/H between the door D and the body C can be prevented.

Next a fifth embodiment of the invention will be described with reference to FIGS. 25 to 27. Same or similar elements as those in the previous embodiments are denoted with the same or similar reference numerals and accordingly a description thereof will be omitted hereinafter.

Figure 25A:
FIG. 25 is a perspective view showing how an auxiliary member to be inserted into the container casing is mounted on a wiring harness according to a fifth embodiment of the invention.
Figure 25B:
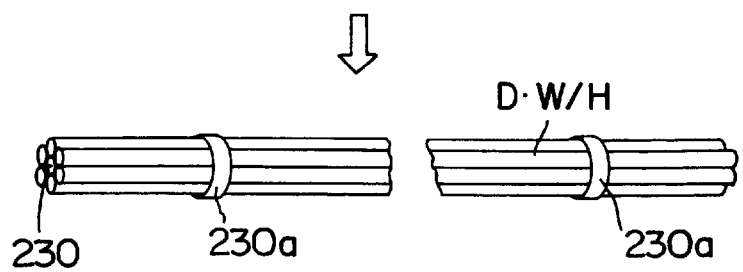

A substantially bar-shaped auxiliary member 230 having preferably a round cross section, is made of a flexible and linear elastic member or material as shown in FIG. 25(A) and is integrally assembled with a part of the door harness DW/H to be accommodated in the container casing 10 e.g. by being located at the axial center of a wire bundle W of the door harness DW/H and by being fixed in suitable intermediate positions by tapes 230a as shown in FIG. 25(B). The door harness DW/H having the auxiliary member 230 arranged preferably at its axial center is inserted into the container casing 10 through the insertion opening 10f as shown in FIG. 26, and is fixed to the harness fixing portion 10h by tape 12 or the like fixing device at the entrance portion of the insertion opening 10f. The auxiliary member 230 is flexible or elastic preferably in a direction other than the longitudinal direction thereof. In other words, the auxiliary member 230 has a tendency to restore its original shape (e.g. the substantially bar-shaped shape) upon a deflection at one or more positions in a radial direction thereof.

Figure 26:
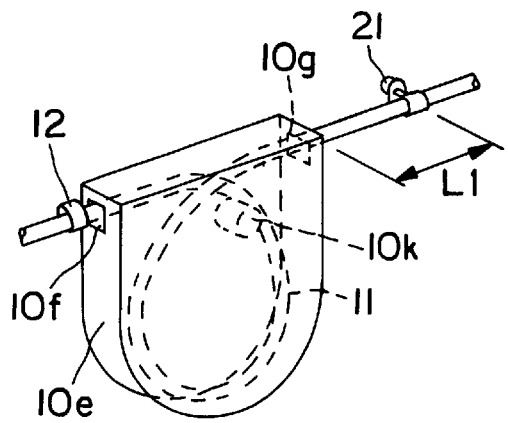
FIG. 26 is a perspective view of the container casing accommodating a wiring harness when a door is closed.
Figure 27:
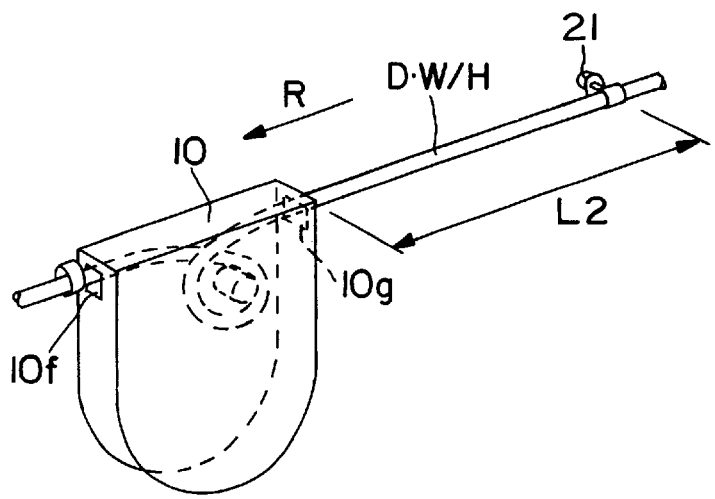
FIG. 27 is a perspective view showing a withdrawn state of the wiring harness when the door is opened.

Inside the container casing 10, the door harness DW/H is withdrawn through the dispensing or withdrawal opening 10f after being looped at least once together with the auxiliary member 230 to substantially surround the projection 10k against the elastic force as shown in FIG. 26. At this time, the door harness DW/H is looped with such a large diameter that it extends substantially along the inner surface of the curved side wall 10e, so that the elastic restoring force of the auxiliary member 230 causes a biasing force to act on the door harness DW/H in a pull-back direction R in which the door harness DW/H is pulled back into the container casing 10. After the door harness DW/H is passed through the container casing 10 while preferably providing a margin length, the lid 10b is closed to engage the lock hole 10m and the lock claw 10n. It should be noted that the bar-shaped auxiliary member 230 may be arranged not only at the axial center of the door harness DW/H, but also at a radially more outward position, e.g. along the substantially outer surface thereof.

On the door panel 1 of the door D on which the container casing 10 is mounted, a weatherstrip 2 is mounted in a position more toward a passenger compartment than a hinge H with the body C (as shown e.g. in FIG. 1). A notch 1g for the insertion of the door harness DW/H is formed in a corner portion between the end surface 1a and an inner plate 1h of the door panel 1 which is located more toward the passenger compartment than the mount position of the weatherstrip 2, and a recess 1k in communication with the notch 1g is formed in the inner plate 1h. The container casing 10 is tightly fitted in the recess 1k.

When the door D is closed in its opened state, the elastic restoring force of the auxiliary member 230 is causing the biasing force to act on the door harness DW/H in the pull-back direction R inside the container casing 10. Accordingly, when the door D is moved in its closing direction, the door harness DW/H is returned into the container casing 10 at a speed preferably faster than the closing speed of the door D while making the diameter of the loop larger. Consequently, the door harness DW/H returns to the state of FIG. 26. Since the door harness DW/H smoothly contracts, it can follow the closing movement of the door D and the jamming of the door harness DW/H between the door D and the body C can be prevented.

Figure 28A:
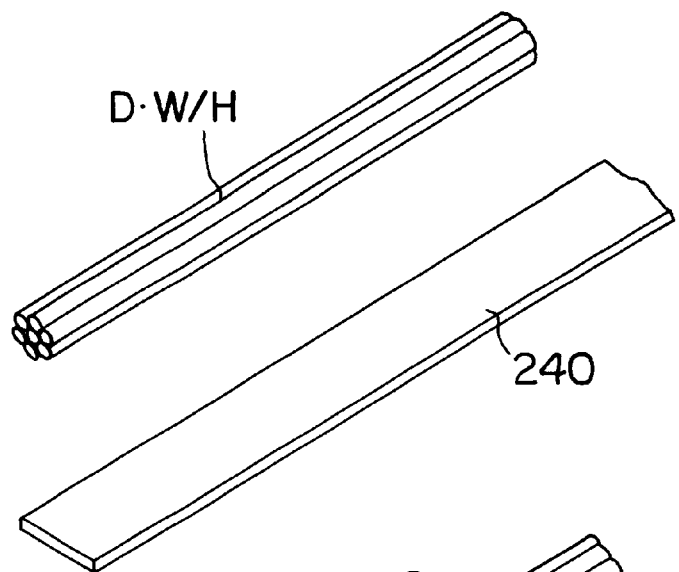
FIGS. 28(A), 28(B) and 28(C) are perspective views showing how an auxiliary member according to a sixth embodiment is mounted and arranged in the container casing.
Figure 28B:
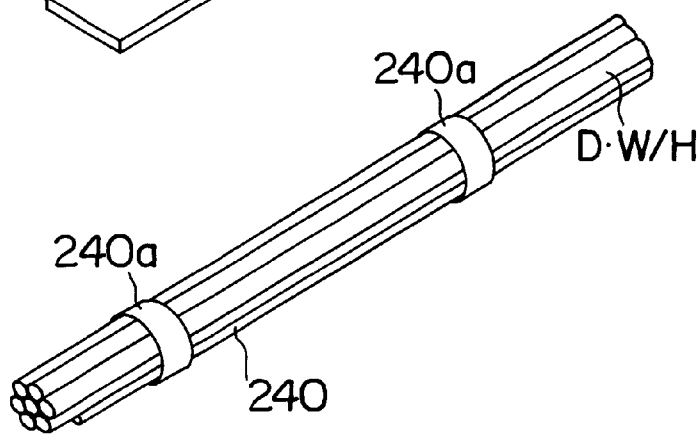
Figure 28C:
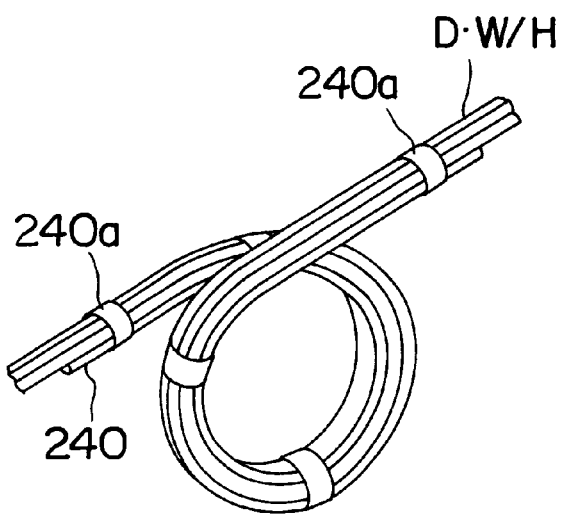

FIGS. 28(A) to 28(C) show a sixth embodiment, in which an auxiliary member 240 for causing a biasing force to act on the door harness DW/H in the pull-back direction into the container casing 10 is a substantially flat plate member made of a flexible elastic member. As shown in FIG. 28(B), the auxiliary member 240 is arranged substantially along the outer surface of the door harness DW/H and integrally assembled therewith by being fixed in opposite end positions and suitable intermediate position(s) by tapes 240a. Subsequently, as shown in FIG. 28(C), the auxiliary member 240 is accommodated together with the door harness DW/H in the container casing 10 after being looped at least once. The returning action of the door harness DW/H by the restoring force of the auxiliary member 240 when the door D is closed is similar to the fifth embodiment.

Figure 29A:
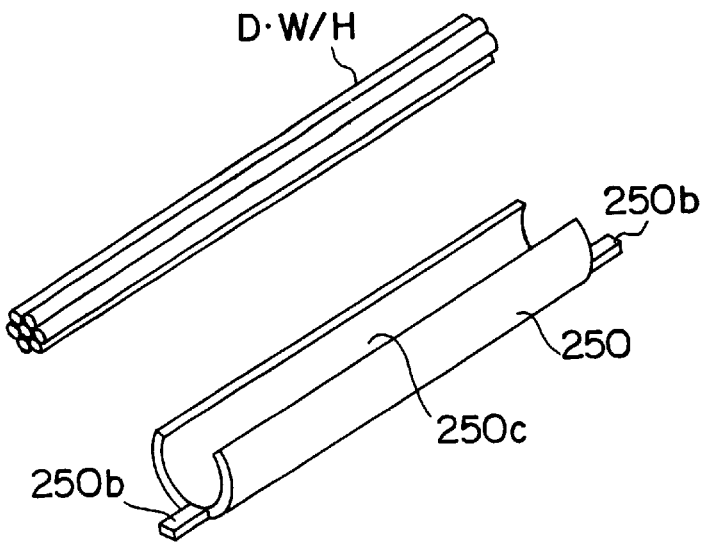
FIGS. 29(A), 29(B) and 29(C) are perspective views showing how an auxiliary member according to a seventh embodiment is mounted and arranged in the container casing.
Figure 29B:
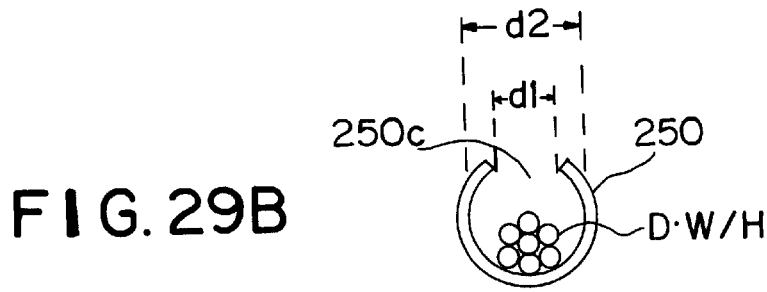
Figure 29C:
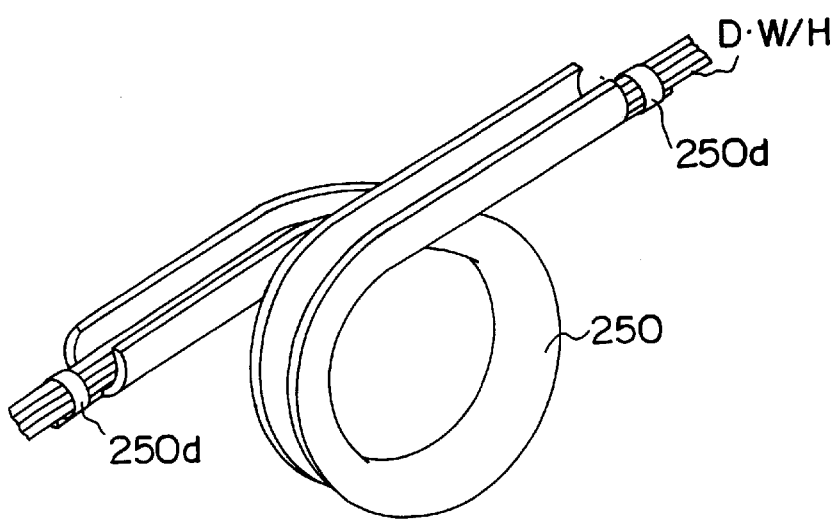

FIGS. 29(A) to 29(C) show a seventh embodiment, in which an auxiliary member 250 for causing a biasing force to act on the door harness DW/H in the pull-back direction into the container casing 10 is a gutterlike member having a substantially C-shaped cross section and made of a flexible elastic member or material. An inner diameter d2 of the auxiliary member 250 is set larger than a width d1 of a gutter portion 250c so that the door harness DW/H can be enclosed in the gutter portion 250c. The auxiliary member 250 is fitted along the outer surface of the door harness DW/H, and is fixed to taping portions 250b projecting from the opposite ends of the auxiliary member 250 by tapes 250d. The auxiliary member 250 is accommodated together with the door harness DW/H in the container casing 10 after being looped once with the gutter portion 250c faced outward.

When the diameter of the loop of the auxiliary member 250 decreases together with that of the door harness DW/H as the door D is opened, the width d1 of the gutter portion 250c of the auxiliary member 250 becomes smaller, with the result that the door harness DW/H is more securely covered by the auxiliary member 250. The returning action of the door harness DW/H by the restoring force of the auxiliary member 250 when the door D is closed is similar to the fifth embodiment. It should be noted that the auxiliary member 250 may be made at least partially of a corrugated member in order to improve its bending property.

According to a further embodiment (not shown) the auxiliary member may be formed by casting or immersing at least a portion of the wiring harness with or in a casting material being resilient, in particular in its cured state, and having the self-restoring properties like or similar to the auxiliary members according to the preceding embodiments.

Figure 30:
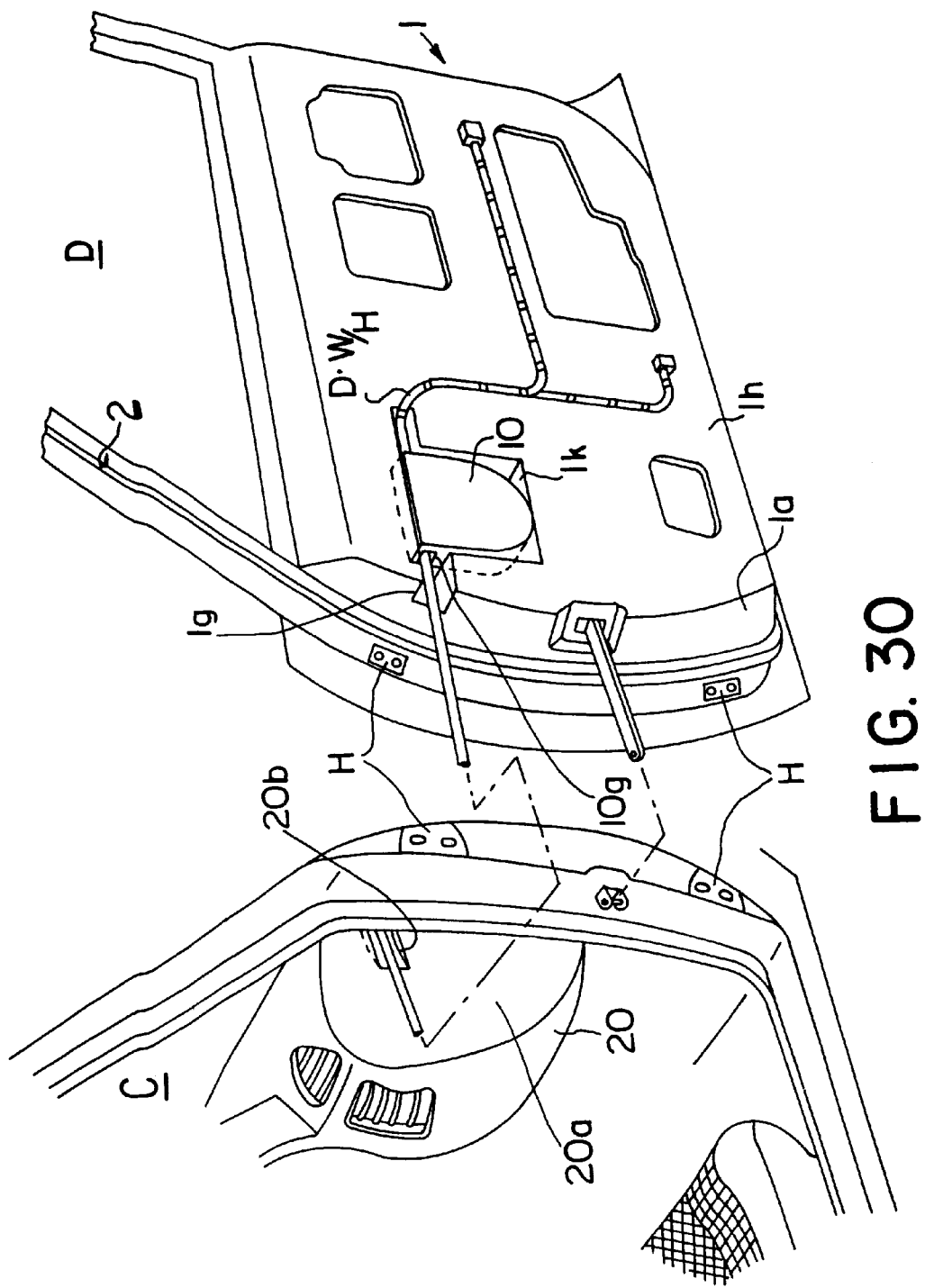
FIG. 30 is a perspective view of a eighth embodiment of the invention.
Figure 31A:
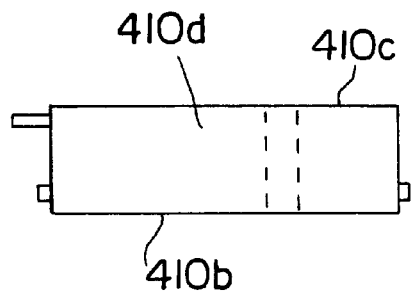
FIGS. 31(A), 31(B) and 31(C) are plan, front and side views of a container casing used in the eighth embodiment, respectively.
Figure 31B:
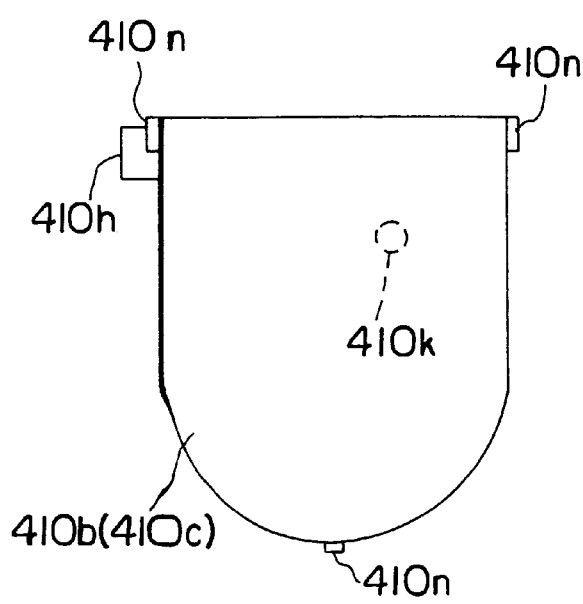
Figure 31C:
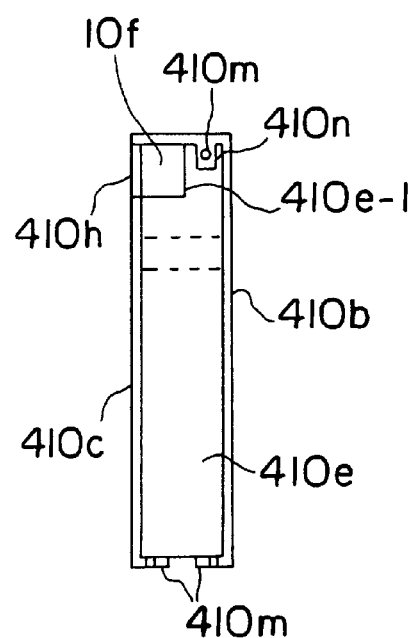
Figure 32A:
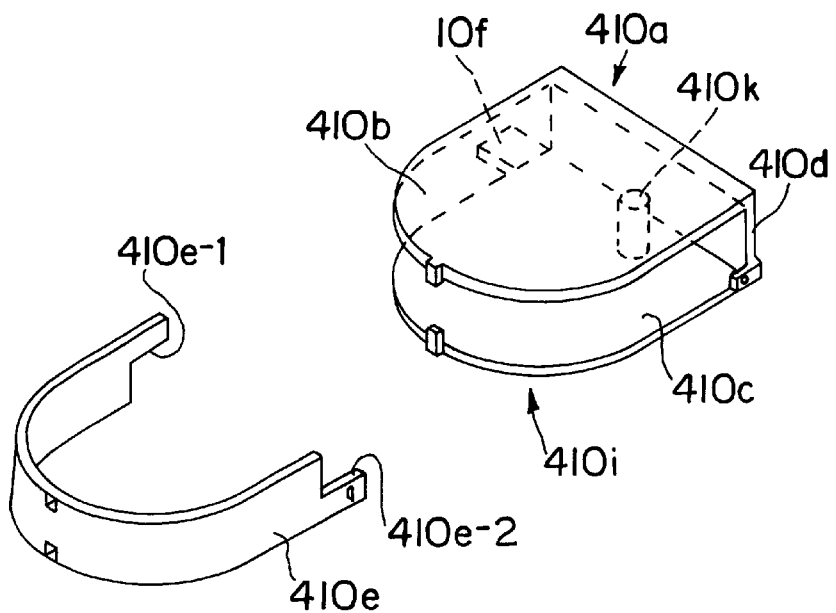
FIGS. 32(A) and 32(B) are an exploded perspective view and a perspective view of the container casing.
Figure 32B:
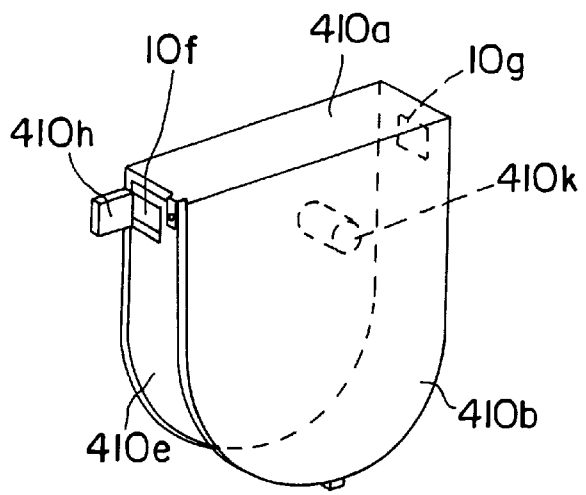
Figure 33:
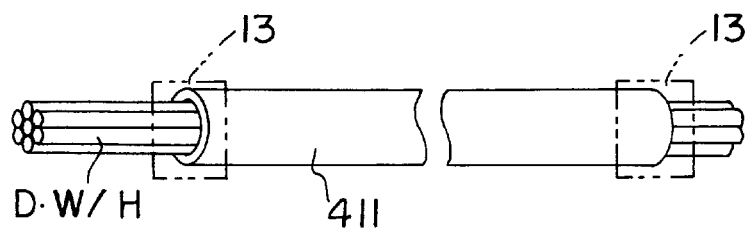
FIG. 33 is a perspective view of a wiring harness to be inserted into the container casing which is covered by a tube.

FIGS. 30 to 35 show a eighth embodiment in which a door harness DW/H is arranged in a door hinge portion between a door D and a body C of a vehicle while extending from a front end surface 1a of a door panel 1 to the body C. After being passed through a container casing 10 configured as shown in FIGS. 31 to 33, a front part of the door harness DW/H arranged in the door hinge portion is pulled toward the body C. In the body C, this front part is inserted into an instrument panel 20 through an opening 20a formed in a side surface of the instrument panel 20 toward the door D, and is secured to an inner surface of the instrument panel 20 by a clamp 21 as shown in FIG. 8.

The container casing 10 has a substantially semicircular shape and acts as a so-called harness spool. The container casing 10 is comprised of a main body 410a and a side plate portion 410e to be mounted on the main body 410a after the door harness DW/H is passed through the container casing 10. The main body 410a and the side plate portion 410e are both made e.g. of resin. The main body 410a includes a substantially semicircular bottom plate 410c, a lid 410b and a connecting plate 410d which is a flat plate for connecting substantially linear parts of the bottom plate 410c and of the lid 410b. A cylindrical stopper projection 410k projects from the bottom plate 410c in a space defined between the bottom plate 410c and the lid 410b. A harness fixing portion 410h projects preferably outward at one end of the periphery of the bottom plate 410c abutting on the connecting plate 410d. In other words, the container casing 10 has a lateral opening 410i, i.e. an opening 410i being arranged at a side of the container casing 10, in which the wiring harness DW/H is substantially bent (to be preferably looped). The side plate portion 410e can substantially close the opening 410i.

The side plate portion 410e has preferably a substantially semicircular shape so as to substantially close an arcuate opening defined between the bottom plate 410c and the lid 410b. Lock claws or projections 410m are formed at the leading ends of the substantially opposite sides of the side plate portion 410e and at the opposite widthwise sides of the apex thereof. The lock claws 410m are inserted into lock holes or recesses of lock portions 410n formed in corresponding positions of the main body 410a to effect locking.

Further, notches are formed at the opposite ends of the side plate portion 410e so as to define an insertion opening 10f and a dispensing or withdrawal opening 10g for the harness together with the connecting plate 410d with the side plate portion fixed to the main body 410a. The insertion and withdrawal openings 10f, 10g are not at the same position, but are displaced along the widthwise direction. Preferably the insertion hole 10f and/or the dispensing or withdrawal hole 10g are formed or defined by recesses 10e-1 and/or 10e-2 in cooperation with the plates 410c, 410d. Accordingly, the opening 410i substantially extends preferably from the position of the insertion opening 10f to the dispensing or withdrawal opening 10g.

Figure 34A:
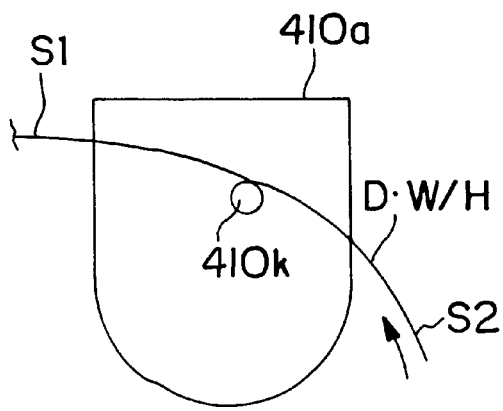
FIGS. 34(A) to 34(D) are schematic diagrams showing a mount procedure of the wiring harness into the container casing.
Figure 34B:
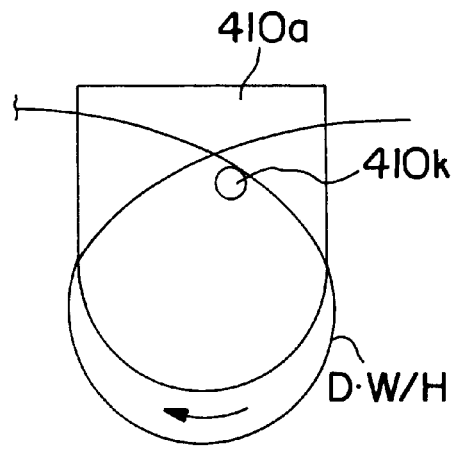
Figure 34D:
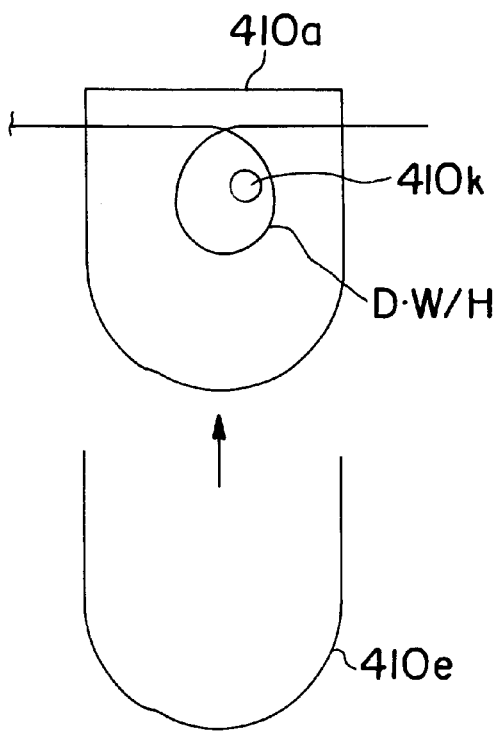
Figure 34C:
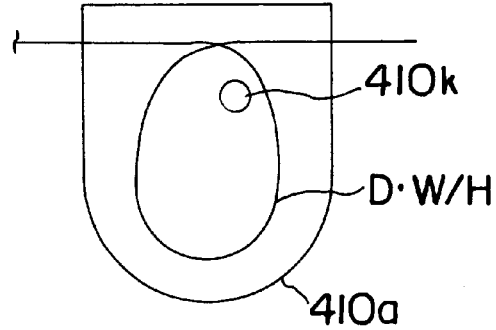

In the container casing 10 is accommodated the door harness DW/H covered by a tube 411 the opposite ends of which are fixed by fixing means, in particular tapes 13 as shown in FIG. 33. The door harness DW/H is inserted through the side opening 410i of the main body 410a as shown in FIGS. 34(A) to 34(D) before the side plate portion 410c is mounted. Specifically, one side S1 of the door harness DW/H is inserted through a clearance between the projection 410k and the connecting plate 410a as shown in FIG. 34(A). Subsequently, after being looped once, the other side S2 is passed between the projection 410k and the connecting plate 410c as shown in FIG. 34(B). Then, the diameter of the loop of the door harness DW/H is made smaller by pulling the portions of the door harness DW/H projecting outward from the opposite sides of the main body 410a so that the looped portion can be substantially located inside the main body 410a as shown in FIG. 34(C). Thereafter, the side plate portion 410e is mounted on and locked with the main body 410a as shown in FIG. 34(D). The door harness DW/H is then fixed to the harness fixing portion 410h by tape 12 at the entrance portion of the insertion opening 10f.

Figure 35A:
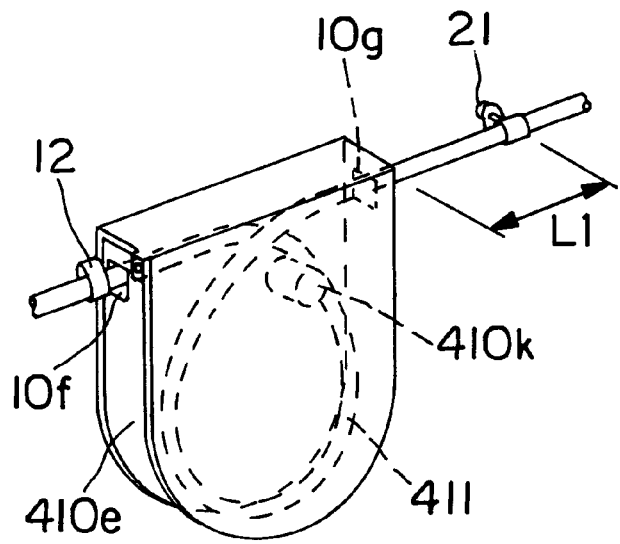
FIG. 35(A) is a perspective view of the container casing accommodating the wiring harness.
Figure 35B:
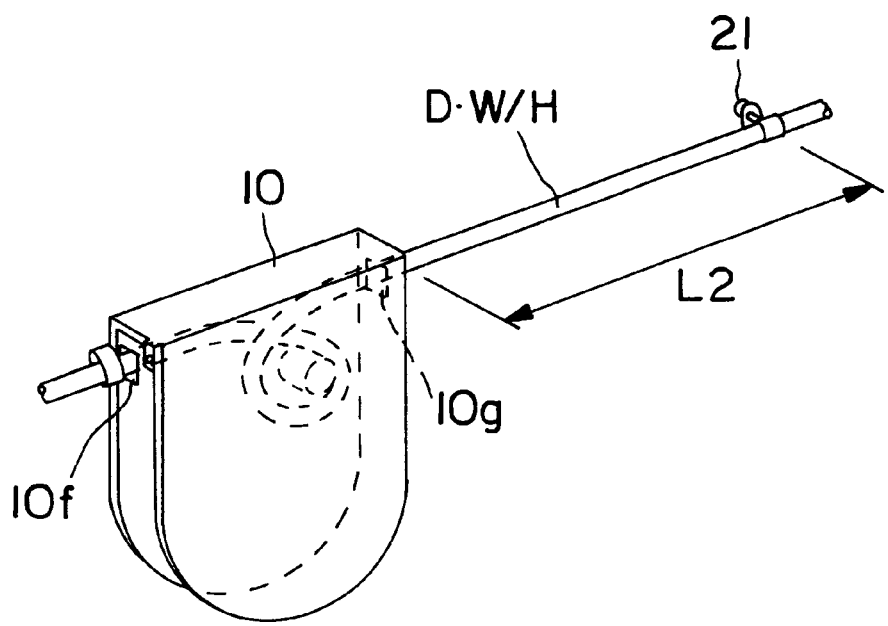
FIG. 35(B) is a perspective view showing a withdrawn state of the wiring harness when the door is opened.

The door harness DW/H is withdrawn through the withdrawal opening 10g after being looped once around the projection 410k inside the container casing 10 as shown in FIGS. 35(A) and 35(B). At this time, the door harness DW/H is looped with a large diameter so as to extend along the inner surface of the curved side wall 410e, and is trained to be looped with this large diameter. In this way, the door harness DW/H is passed through the container casing 10 while providing a margin length.

Since the tube 411 is made e.g. of a nylon tube having a specified thickness and has a smooth outer surface, it can smoothly move in the container casing 10. The door harness DW/H may be trained to be looped with a large diameter so as to have a self-restoring property of returning to its original shape of FIG. 35(A) when a pulling force is released with the door harness DW/H withdrawn as shown in FIG. 35(B). This training helps the biasing force of the spring 30b in pulling the door harness DW/H back. Further, by being covered with the tube 411, the sliding movement of the door harness DW/H inside the container casing 10 does not cause abrasion of the coating thereof.

On the door panel 1 of the door D on which the container casing 10 is mounted, a weatherstrip 2 is mounted in a position more toward a passenger compartment than a hinge H with the body C as shown in FIG. 30. A notch 1g for the insertion of the door harness DW/H is formed in a corner portion between the end surface 1a and an inner plate 1h of the door panel 1 which is located more toward the passenger compartment than the mount position of the weatherstrip 2, and a recess 1k in communication with the notch 1g is formed in the inner plate 1h. The container casing 10 is tightly fitted in the recess 1k.

The door harness DW/H having its front part inserted through the container casing 10 as shown in FIGS. 35(A) and 35(B) is arranged along the inner surface of the inner plate 1h of the door panel 1. The container casing 10 is fitted in the recess 1k. In this state, the inner plate 1h is covered by a trim panel (not shown) to fix the container casing 10 inside the door D.

The door harness DW/H withdrawn from the container casing 10 through the withdrawal opening 10g is extended to the body C and, as described above, is secured to the inner surface of the instrument panel 20 by the clamp 21 after being inserted through the opening 20b formed in the side surface 20a of the instrument panel 20. The mount state shown in FIG. 35(A) is obtained when the door D is closed. At this time, the length of the door harness DW/H from the container casing 10 mounted on the door D to the position where it is secured to the body C is L1 and the length thereof looped inside the container casing 10 is a margin length.

As described above, since the container casing 10 is fitted in the recess 1k formed in the position more toward the passenger compartment than the support position of the hinge H and the weatherstrip 2 and the door harness DW/H is extended to the instrument panel 20, the door harness DW/H needs to extend while twisting according an opening angle of the door D when the door D is opened. Likewise, the door harness DW/H needs to contract while untwisting when the door D is closed.

When the door D is opened in the closed state shown in FIGS. 35(A) and 8(A), the door harness DW/H inside the container casing 10 is withdrawn through the withdrawal opening 10g while making the diameter of the loop of the door harness DW/H smaller against the spring force of the windup spring 30. When the door D is fully opened, the length of the door harness DW/H from the container casing 10 to the clamp 21 is extended to L2 as shown in FIGS. 35(B) and 8(B). The door harness DW/H is withdrawn from the container casing 10 by a difference (L2−L1) between the lengths L2 and L1. In addition, the door harness DW/H is wound around the windup spring 30 which is tightly wound around the projection 410k for stopping the withdrawal of the door harness DW/H with a reduced diameter, thereby preventing any further withdrawal of the door harness DW/H lest the withdrawn door harness DW/H should slacken between the door D and the body C.

As described above, when the door D is opened, the door harness DW/H extends, following the opening movement of the door D. The door harness DW/H withdrawn from the container casing 10 can twist itself and, accordingly, it can extend while twisting.

The tube 411 covering the door harness DW/H has a self-restoring property of returning to its original shape. Accordingly, when the door D is closed in its opened state, the door harness DW/H is returned into the container casing 10 by the restoring force of the tube 411 at a speed preferably faster than a closing speed of the door D while making the diameter of the loop larger. Consequently, the door harness DW/H returns to the state of FIG. 35(A). Since the door harness DW/H smoothly contracts, it can follow the closing movement of the door D and the jamming of the door harness DW/H between the door D and the body C can be prevented.

Figure 36A:
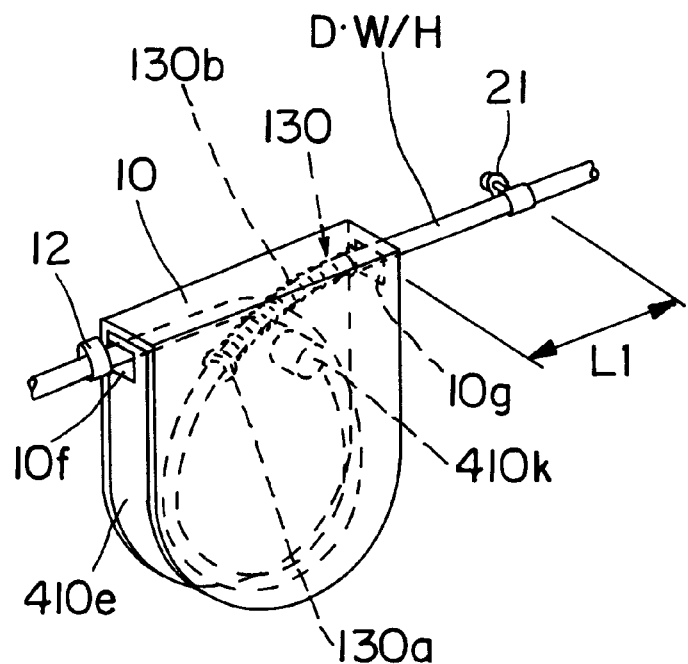
FIG. 36(A) is a perspective view of the container casing accommodating the wiring harness according to a ninth embodiment.
Figure 36B:
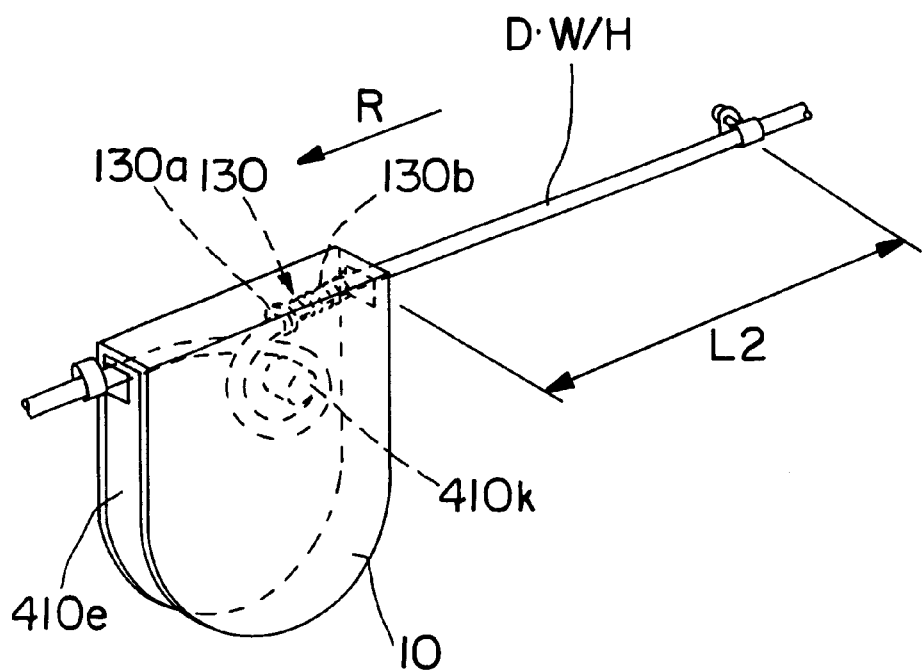
FIG. 36(B) is a perspective view showing a withdrawn state of the wiring harness when the door is opened according to a ninth embodiment.
Figure 39:
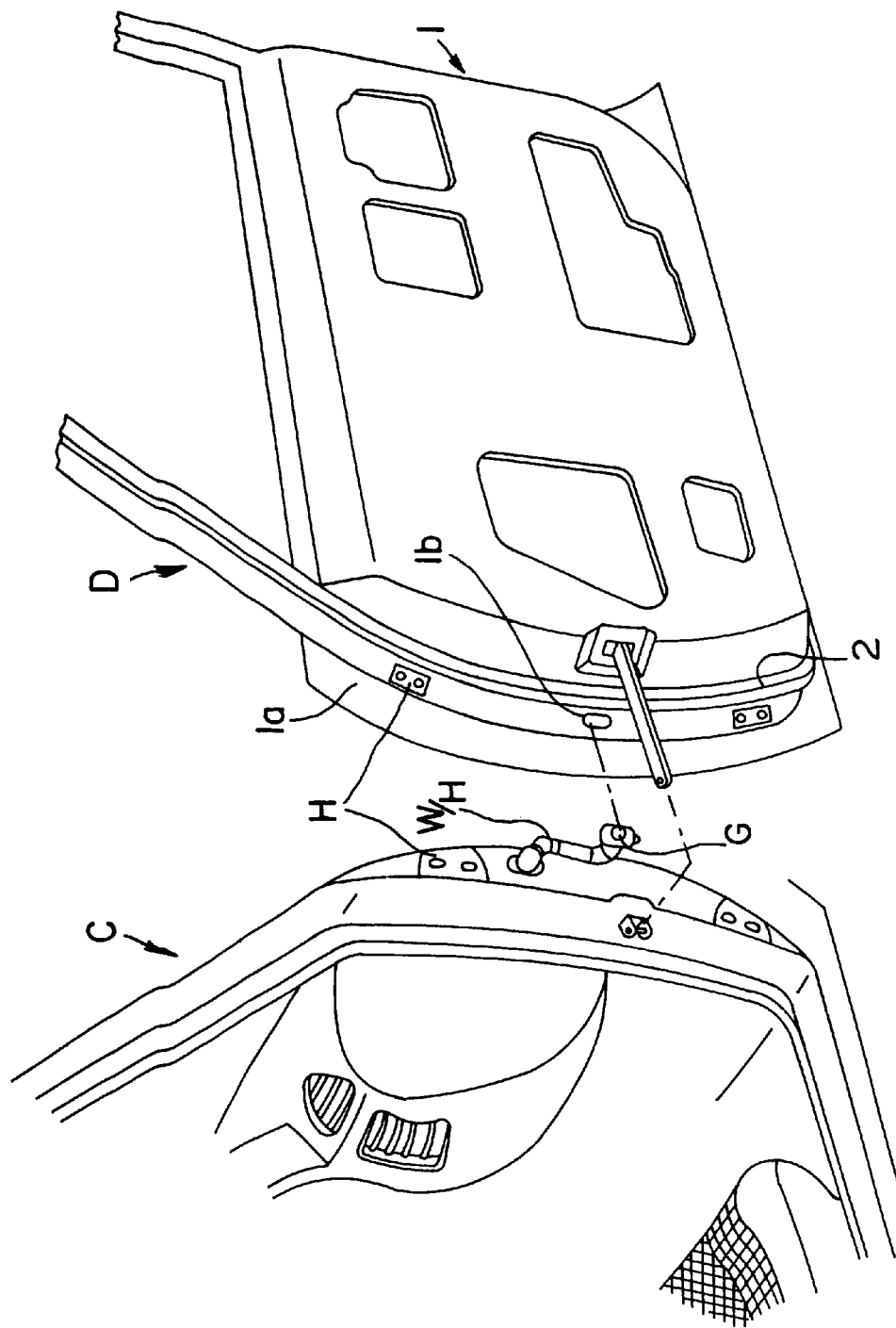
FIG. 39 is an exploded perspective view of a prior art door hinge portion.
Figure 40:
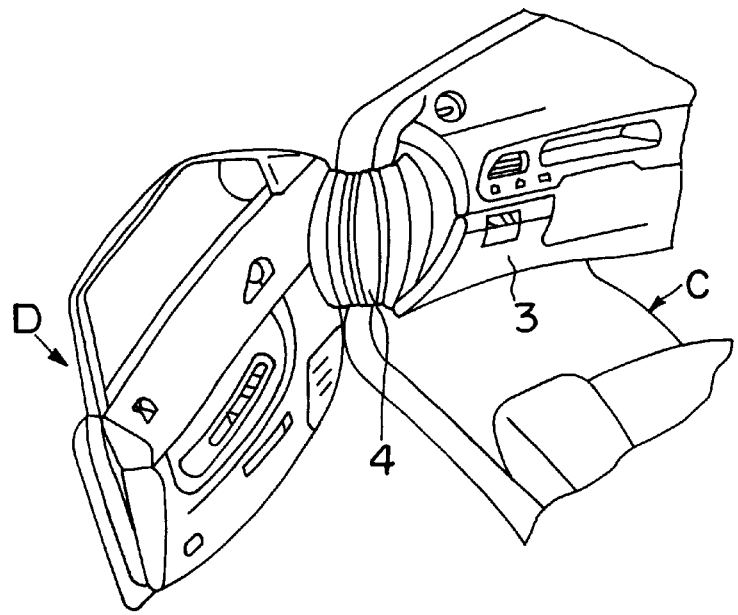
FIG. 40 is a perspective view of another prior art.
Figure 41:
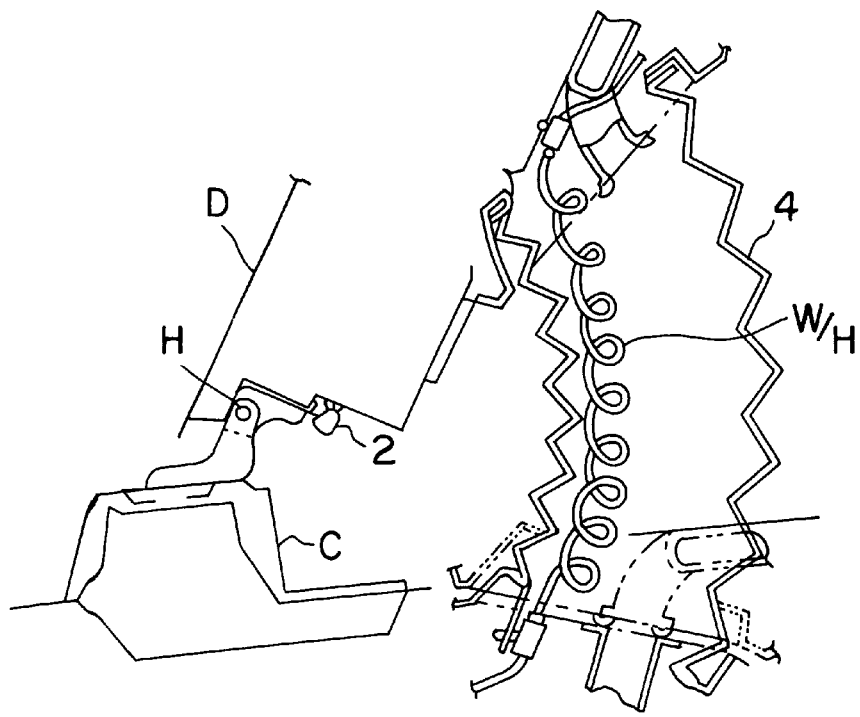
FIG. 41 is an enlarged section of an essential portion of the prior art of FIG. 40.

In FIGS. 36(A) and 36(B) is shown a ninth embodiment of the invention. The embodiment is substantially similar to the eight embodiment and similar or same parts are denoted with similar or same reference numerals. Accordingly a description thereof will be omitted hereinafter. The ninth embodiment further comprises a pull-back means 130, preferably in the form of a helicoidal spring, which has already been described with reference to the fourth embodiment (FIGS. 22 and 23). Accordingly reference is made to the according above description.

FIGS. 37, 38(A) to 38(D) show a tenth embodiment of the invention, in which a separate projection member 410k' which acts as the projection 410k provided in the container casing 10 is mounted later. A lid 410b of a main body 410a is formed with a mount hole 410b-1. The projection member 410k' is inserted or insertable into the mount hole 410b-1 and fixed by the engagement of a large diameter portion 410k'-1 provided at the leading end of the projection member 410k' and the lid 410b.

If the projection member 410k' is mounted later, the door harness DW/H can be inserted through the side opening of the main body 410a after being looped at least once and the projection member 410k' can be mounted after being positioned inside the loop of the door harness DW/H as shown in FIGS. 38(A) to 38(D). Accordingly, the door harness DW/H can be easily mounted. After the door harness DW/H is inserted into the main body 410a, the side plate portion 410e is mounted and locked similar to the eighth embodiment.

Also the eighth to tenth embodiment may be arranged like the second embodiment described with reference to FIGS. 8 to 10. Accordingly reference is made to the above description.

The present invention is not limited to the foregoing embodiments. For example, the insertion and withdrawal openings of the container casing may be formed at different stages and the bottom surface of the container casing may be slanted. With this arrangement, portions of the harness inside the container casing do not directly cross each other, i.e. do not touch each other and, accordingly, the harness can be looped without being entangled.

As is clear from the above description, the wiring harness to be arranged between the door and the body of the vehicle is arranged not in the same position as the hinge position, but in the position more inward toward the passenger compartment. Accordingly, the wiring harness is required to have both an extendible/contractible function and a twisting or bending function when the door is opened and closed. Since the container casing having a function of extending and contracting the wiring harness is provided, the wiring harness can extend and contract as the door is opened and closed. Further, since the wiring harness withdrawn from the container casing can twist itself, it can smoothly follow the opening and closing movements of the door.

Further, since the wiring harness inside the container casing is biased by the pull-back or biasing means, e.g. the windup spring in such a direction as to be returned into the container casing or so as to be contracted, it can be returned into the container casing faster than the closing speed of the door when the door is closed.

Since the container casing has such a small configuration which only accommodates the wiring harness in a looped state, it can be mounted in a small space. Further, since the container casing is not very much exposed to the passenger compartment, it does not degrade the appearance. Even if the container casing is mounted on the door, since it is small and lightweight, the mounting of the container casing does not require an increased force to open and close the door, i.e. does not make the door heavier to open and close.

Further, since the wiring harness is arranged or arrangeable in a position more inward than the hinge position and the weatherstrip, it is not necessary to provide a water preventing means for the wiring harness, obviating the need to use grommets or like conventional water preventing devices.

Furthermore, since the wiring harness is arranged at the side of the inner surface of the inner plate of the door panel, a conventionally required operation of arranging the wiring harness inside the door panel and withdrawing it through the through hole formed in the front end surface of the door panel can be eliminated. As a result, an operation of arranging the wiring harness into the door panel can be considerably made easier as compared with the prior art.

What is claimed is:

1. A wiring harness assembly for a wiring harness that extends between a first element and a second element, at least one of said first and second elements being selectively movable between a closed condition, where said elements are adjacent, and an open condition, where said elements are at least partly separated, said assembly comprising:

a container casing rigidly mounted to the first element, the container casing comprising substantially rigid planar parallel top and bottom walls, a sidewall extending rigidly between the top and bottom walls, insertion and dispensing openings being formed through the sidewall in spaced relationship to one another, and a tab substantially adjacent said insertion opening;

the wiring harness having first and second ends secured respectively at the first and second elements, all of said wiring harness being formed into at least one loop such that all of said wiring harness is turned through at least 360°, said loop defining a diameter, said loop being disposed in said container casing, a first portion of said wiring harness being between the loop and the first end and passing through the insertion opening, a second portion of the wiring harness being between the loop and the second end and passing movably through the dispensing opening such that said diameter of said at least one loop expands in response to movement of said first and second elements toward the closed condition and such that the diameter of said at least one the loop contracts in response to movement of the first and second elements toward the open condition; and an attachment structure for securely fixing the first portion of the wiring harness to the tab of the container casing.

2. The assembly of claim 1, wherein the tab is substantially coplanar with the bottom wall of the container casing.

3. The assembly of claim 1, wherein the top and bottom walls each include a linear edge, said linear edges being substantially parallel, the sidewall comprising at least one planar sidewall section extending rigidly from said linear edge of said bottom wall, said top wall being articulated to said planar sidewall section for selective movement of said top wall away from the bottom wall, said insertion and dispensing openings extending through portions of said sidewall adjacent said planar sidewall section.

4. The assembly of claim 3, wherein the plurality of sidewalls further comprise an arcuate sidewall substantially opposite the planar sidewall, the arcuate sidewall defining a diameter greater than the diameter of the loop when the first and second elements are in said closed condition.

5. The assembly of claim 4, further comprising a pull-back means for pulling the wiring harness into the container casing as the first and second elements are moved toward the closed condition.

6. The assembly of claim 5, wherein the pull-back means comprises a windup spring having a fixed end secured to one of the top and bottom walls and spaced from the sidwalls, the windup spring further having a free end biased outwardly from the fixed end, windup spring being disposed inwardly from the loop of the wiring harness, such that biasing forces of the windup spring are operative to expand the loop and withdraw the wiring harness into the container casing when the first and second elements are moved to the closed condition.

7. The assembly of claim 5, wherein the pull-back means comprises a substantially arcuate spring piece having an inner end secured to one of the top and bottom walls and spaced from the sidewalls, an outer portion of the arcuate spring piece extending toward an inner surface of the arcuate sidewall in an expanded state of said arcuate spring piece, the loop of the wiring harness being disposed between the inner surface of the arcuate sidewall and the arcuate spring piece.

8. The assembly of claim 5, wherein the arcuate spring piece has a free end remote from the inner end, the free end of the arcuate spring piece being thinned so as not to exert a load on the wiring harness.

9. The assembly of claim 5, wherein the pull-back means comprises a spring seat mounted on the wiring harness and a coil spring mounted around the wiring harness between the spring seat and the dispensing opening of the container casing.

10. The assembly of claim 5, wherein the pull-back means comprises a tube through which a portion of the wiring harness extends, the tube being looped with the loop of the wiring harness around the projection, the tube being formed from a resilient material having a self-restoring property of returning substantially to its original shape for withdrawing the wiring harness back into the container casing when the first and second elements are moved to the closed condition.

11. The assembly of claim 5, wherein the pull-back means comprises an auxiliary member made of a flexible and initially substantially linear elastic material integrally assembled with the portion of the wiring harness defining the loop in the container casing, the auxiliary member exhibiting a biasing force for causing the wiring harness to be withdrawn into the container casing.

12. A wiring harness assembly for a wiring harness that extends between a first element and a second element, at least one of said first and second elements being selectively movable between a closed condition, where said elements are substantially adjacent, and an open condition, where said elements are at least partly separated, said assembly comprising:
   a container casing rigidly mounted to said first element, the container casing comprising substantially rigid top and bottom walls disposed in spaced relationship to one another, a sidewall extending rigidly between said top and bottom walls, at least one section of said sidewall being substantially arcuate, insertion and dispensing openings formed through said sidewall in substantially opposed relationship to one another; and
   a wiring harness having first and second ends secured respectively at the first and second elements, said wiring harness being formed into a single loop such that all of said wiring harness is turned through substantially 360°, said loop being disposed such that a first portion of said wiring harness between the loop and the first end passes through the insertion opening, and such that a second portion of the wiring harness between the loop and the second end passes through the dispensing opening, at least one of said first and second portions of said wiring harness being movable through a corresponding one of said insertion opening and said dispensing opening in response to movement of said first and second elements between the opened and closed conditions, such that said single loop varies in diameter as said first and second elements are selectively moved between the closed condition and the open condition.

13. The assembly of claim 12, wherein the top and bottom walls are substantially planar and substantially parallel.

14. The assembly of claim 13, wherein the sidewalls are aligned substantially orthogonal to the top and bottom walls.

15. The assembly of claim 14, wherein the sidewalls comprise a planar sidewall and an arcuate sidewall, said planar sidewall being spaced from said arcuate sidewall such that said insertion and dispensing openings are formed in spaces between said planar sidewall and said arcuate sidewall.

16. The assembly of claim 15, wherein said top wall is hingedly articulated to said planar sidewall for accessing interior portions of said container.

17. The assembly of claim 12, wherein the top and bottom walls are substantially planar and substantially parallel, said plurality of sidewalls comprising a planar sidewall formed unitarily with said top and bottom walls and extending orthogonally therebetween, said plurality of sidewalls further comprising an arcuate sidewall removably disposed between said top and bottom walls such that removal of said arcuate sidewall enables access to interior portions of said container casing for positioning said loop therein, said arcuate sidewall being spaced from said planar sidewall such that said insertion and dispensing openings are defined intermediate said arcuate sidewall and said planar sidewall.

18. A wiring harness assembly for a wiring harness that extends between a first element and a second element, at least one of said first and second elements being selectively movable between a closed condition, where said elements are substantially adjacent, and an open condition, where said elements are at least partly separated, said assembly comprising:
   a container casing rigidly mounted to said first element, the container casing comprising substantially rigid top and bottom walls disposed in spaced relationship to one another, a sidewall extending rigidly between said top and bottom walls, at least one section of said sidewall being substantially arcuate, insertion and dispensing openings formed through said sidewall in substantially opposed relationship to one another;
   a wiring harness having first and second ends secured respectively at the first and second elements, all of said wiring harness being formed into at least one loop, such that all of said wiring harness extends through at least 360°, said loop being disposed within said container casing, a first portion of said wiring harness being disposed between said at least one loop and the first end and passing through the insertion opening, a second portion of the wiring harness being disposed between said at least one loop and the second end and passing through the dispensing opening, such that said diameter of said at least one loop expands and contracts in response to movement of said first and second elements between the open and closed condition while varying the diameter of said at least one loop; and
   pullback means mounting to the wiring harness for pulling the wiring harness into the container casing when the first and second elements are moved from the open condition to the closed condition.

19. The assembly of claim 18, wherein the pullback means is disposed within the container casing.

20. The assembly of claim 19, wherein said at least one loop is wrapped around said pullback means.

21. The assembly of claim 19, wherein the pullback means is a spring disposed between said dispensing opening and said at least one loop.

22. The assembly of claim 6, wherein the windup spring is of unitary construction, a projection being secured to a selected one of the top and bottom walls of the container, the fixed end of the windup spring being secured to the projection such that portions of the unitary windup spring between the projection and the free end are coiled around the projection.

23. The assembly of claim 12, further comprising a unitarily formed windup spring having a fixed inner end secured to at least a selected one of the top and bottom walls and a free end, portions of said windup spring between said fixed end and said free end being formed into a coil, said windup spring being disposed in said container and said single loop of said wiring harness being formed around said windup spring.

24. The assembly of claim 20, wherein said pullback means comprises a unitarily formed windup spring, said windup spring having an inner end fixed to at least a selected one of the top and bottom walls and a free end between the fixed end and one of said sidewalls of said container, portions of said windup spring between said fixed end and said free end defining a coil.

* * * * *